(12) United States Patent
Menegozzi et al.

(10) Patent No.: US 8,830,122 B2
(45) Date of Patent: Sep. 9, 2014

(54) PHASE RATE OF CHANGE TECHNIQUES FOR PASSIVE GEO-LOCATION OF RADIO FREQUENCY EMITTERS

(75) Inventors: Lionel Nicholas Menegozzi, Annandale, NJ (US); Suzanne Elaine Holden, Ridgewood, NJ (US); Edward F. Van Alstine, Lake Ariel, PA (US); Robert G. Palazzo, Clifton, NJ (US); Martin James Apa, Wayne, NJ (US)

(73) Assignee: Exelis, Inc., McLean, VA (US)

( * ) Notice: Subject to any disclaimer, the term of this patent is extended or adjusted under 35 U.S.C. 154(b) by 600 days.

(21) Appl. No.: 13/157,770

(22) Filed: Jun. 10, 2011

(65) Prior Publication Data

US 2012/0313816 A1 Dec. 13, 2012

(51) Int. Cl.
*G01S 19/54* (2010.01)
*G01S 19/42* (2010.01)

(52) U.S. Cl.
USPC .................................. 342/357.37; 342/357.25

(58) Field of Classification Search
USPC ............... 342/126, 156, 357.25, 357.37, 442, 342/445, 451
See application file for complete search history.

(56) References Cited

U.S. PATENT DOCUMENTS

| | | | |
|---|---|---|---|
| 3,935,574 | A | 1/1976 | Pentheroudakis |
| 4,734,202 | A | 3/1988 | Mach |
| 4,734,702 | A | 3/1988 | Kaplan |
| 5,343,212 | A | 8/1994 | Rose |
| 5,434,212 | A | 7/1995 | Yatsunami |
| 5,526,001 | A | 6/1996 | Rose et al. |
| 6,784,840 | B2 | 8/2004 | Menegozzi |
| 7,286,085 | B2 | 10/2007 | Kolanek |

FOREIGN PATENT DOCUMENTS

WO   WO2012/170656   12/2012

OTHER PUBLICATIONS

Blachman, N., "On Combining Target-Location Ellipses," IEEE Transactions on Aerospace and Electronic Systems, vol. 25, pp. 284-287, Mar. 1989.
Hsiung, D. et al., "The Development of Multi-Processor Software for the Demonstration of Passive Real Time Threat Emitter Location," Proceedings of the IEEE 1992 National Aerospace and Electronics Conference, vol. 2, pp. 650-656, May 1992.
Jacobs, E. et al., "Ambiguity Resolution in Interferometry," IEEE Transactions on Aerospace and Electronic Systems, vol. AES-17, No. 6, pp. 766-780, Nov. 1981.
Niemeijer, Reint, EPO Authorized Officer, Search Report for PCT/US2012/041290(WO2012/170656), Oct. 18, 2012.
Danxing Zhong et al., "A Range-Parameterized Emitter Location Method From a Single Moving Observer With Variable Attitudes", Radar, 2006. CIE '06. International Conference on, IEEE, PE, Oct. 1, 2006, pp. 1-4.
Kihwan Moon, EPO Authorized Officer, Written Opinion for PCT/US2012/041290, Dec. 27, 2013.

*Primary Examiner* — Dao Phan
(74) *Attorney, Agent, or Firm* — RatnerPrestia

(57) ABSTRACT

The present invention relates to a system for resolving phase ambiguities in phase rate of change (PROC) measurements of a long baseline interferometer (LBI). The system includes an LBI having a first antenna and a second antenna positioned on a vehicle to receive the RF signal transmitted by the RF emitter, and a processor positioned on the vehicle. The processor is configured to determine a first phase rate of change (PROC) of the RF signal received by the LBI over a short time interval to produce a short time interval range estimate of the RF emitter, determine a second PROC of the RF signal received by the LBI over a long time interval which is greater than the short time interval, to produce a plurality of ambiguous long time interval range estimates of the RF emitter, and c) select one of the plurality of long time interval range estimates based on the short time interval range estimate.

20 Claims, 22 Drawing Sheets

PHASE RATE OF CHANGE TECHNIQUES FOR PASSIVE GEO-LOCATION OF RADIO FREQUENCY EMITTERS

FIELD

The present invention relates, in general, to a system for passively determining the geo-location of a radio frequency (RF) emitter. More specifically, the present invention relates to a long baseline interferometer system that performs a phase rate of change (PROC) computation at different time intervals.

BACKGROUND

Measurements of the angle-rate-of-change with a long baseline interferometer (LBI) allows for a method of passively determining the range to an RF emitter. In general, this leads to rapid and more accurate results than conventional triangulations performed via angle-of-arrival (AOA) measurements. This improvement stems from the well-known relationship between the angle-rate-of-change (AROC) and the phase-rate-of-change (PROC), with accuracy enhancements due to the large ratio between the LBI-arm length ($d_{LBI}$) and radiation wavelength ($\lambda$). The relationship leads to an algorithm which substitutes the sequential angle measurements in conventional triangulation schemes with precision phase-rate-of-change (PROC) determinations.

Prior PROC geo-location implementations, however, had problems meeting desired geo-location accuracies because, as LBI baselines and PROC time intervals are increased, the number of range ambiguities increases to the point where geo-location algorithms cannot dependably determine a unique location estimate for the RF emitter.

SUMMARY

To meet this and other needs, and in view of its purposes, the present invention provides a system for determining a location of a radio frequency (RF) emitter transmitting an RF signal. The system includes a long baseline interferometer (LBI) including a first antenna and a second antenna positioned on a vehicle to receive the RF signal transmitted by the RF emitter, a short baseline interferometer (SBI) including a third antenna and a fourth antenna positioned on the vehicle to receive the RF signal transmitted by the RF emitter, and a processor positioned on the vehicle.

The processor is configured to a) determine a first phase rate of change (PROC) of the RF signal received by the LBI over a short time interval to produce a short time interval range estimate of the RF emitter, b) determine a second PROC of the RF signal received by the LBI over a long time interval which is greater than the short time interval to produce a plurality of long time interval range estimates of the RF emitter, c) determine an angle of arrival (AOA) of the RF signal received by the SBI, d) select one of the plurality of long time interval range estimates based on the short time interval range estimate, and e) determine the location of the RF emitter based on the selected long time interval range estimate and the measured AOA.

In one embodiment, the processor is configured to repeat steps a-e a plurality of times to determine a plurality of locations of the RF emitter, and determine a final location based on the plurality of locations.

In one embodiment, the system includes another LBI including a fourth antenna and a fifth antenna positioned on the vehicle to receive the RF signal transmitted by the RF emitter, and another SBI including a sixth antenna and a seventh antenna positioned on the vehicle to receive the RF signal transmitted by the RF emitter. Concurrent with performing steps a-e with the LBI and SBI, the processor is configured to perform steps a-e with the other LBI and the other SBI, and the processor determines a final location of the RF emitter based on the location determined by the LBI and the SBI, and the location determined by the other LBI and the other SBI.

In one embodiment, the system includes another LBI including a fourth antenna and a fifth antenna positioned on another vehicle to receive the RF signal transmitted by the RF emitter. The system also includes another processor positioned on the other vehicle configured to perform steps a, b and d with the other LBI on the other vehicle to produce another short time interval range estimate of the RF emitter, another plurality of long time interval range estimates of the RF emitter, and another selected one of the other plurality of long time interval range estimates. The system also includes a transmitter positioned on the other vehicle for transmitting the other selected one of the other plurality of long time interval range estimates to the vehicle. The vehicle utilizes the other selected one of the other plurality of long time interval range estimates to perform step e.

In one embodiment, the system includes an adaptive filter for adaptively filtering the plurality of locations to determine the final location. In one embodiment, the location is a relative location from the vehicle to the RF emitter determined by a relative distance and a relative angle from the vehicle to the RF emitter.

In one embodiment, the system includes a GPS receiver for receiving GPS signals. The processor is configured to determine a geo-location of the vehicle based on the GPS signals at each of steps a, b and c, and determine the geo-location of the RF emitter based on the AOA computed in step c, the selected long time interval range estimate selected in step d, and the geo-location of the vehicle computed in steps a, b and c.

In one embodiment, the present invention provides system for determining a location of a radio frequency (RF) emitter transmitting an RF signal. The system including a long baseline interferometer (LBI) including a first antenna and a second antenna positioned on a vehicle to receive the RF signal transmitted by the RF emitter, a navigation system positioned on the vehicle, and a processor positioned on the vehicle.

The processor is configured to a) determine a first phase rate of change (PROC) of the RF signal received by the LBI over a short time interval to produce a short time interval range estimate of the RF emitter, b) determine a second PROC of the RF signal received by the LBI over a long time interval which is greater than the short time interval, to produce a plurality of long time interval range estimates of the RF emitter, c) record a first position of the vehicle during step a, and a second position of the vehicle during step b using the navigation system, d) select one of the plurality of long time interval range estimates based on the short time interval range estimate, e) repeat steps a-c a predetermined number of times to produce a plurality of selected long time interval range estimates, and a plurality of recorded positions of the vehicle, and f) determine the geo-location of the RF emitter based on the plurality of selected long time interval range estimates and plurality of recorded positions of the vehicle.

In one embodiment, the system includes a short baseline interferometer (SBI) including a third antenna and a fourth antenna positioned on the vehicle to receive the RF signal transmitted by the RF emitter. The processor is configured to determine an angle of arrival (AOA) of the RF signal received by the SBI, and perform step f based on the AOA.

In one embodiment, the system includes another LBI including a third antenna and a fourth antenna which are positioned on the vehicle to receive the RF signal transmitted by the RF emitter. The processor is configured to simultaneously perform steps a-f with the LBI and the other LBI.

In one embodiment, the system includes another LBI including a third antenna and a fourth antenna which are positioned on another vehicle to receive the RF signal transmitted by the RF emitter, another processor positioned on the other vehicle configured to perform steps a-e to produce another plurality of selected long time interval range estimates, another plurality of recorded positions of the other vehicle, and a transmitter positioned on the other vehicle for transmitting the other plurality of selected long time interval range estimates, and the other plurality of recorded positions to the vehicle. The vehicle utilizes the other transmitter for transmitting the other plurality of selected long time interval range estimates to perform step f.

In one embodiment, the system includes an adaptive filter, and the processor is configured to repeat steps a-f to determine a plurality geo-locations of the RF emitter, and determine a maximum likelihood geo-location of the RF emitter by adaptively filtering the plurality of geo-locations.

In one embodiment, the system includes a GPS receiver for receiving GPS signals. The processor is configured to determine the geo-location of the vehicle based on the received GPS signals, and determine the geo-location of the RF emitter based on the geo-location of the vehicle and the selected long time interval range estimates.

In one embodiment, the system includes an attitude sensor that senses the roll, pitch and yaw of the vehicle. The processor is configured to measure a first attitude when measuring the first PROC, measure a second attitude when measuring the second PROC, and remove phase artifacts from the second PROC which are present due to differences between the first attitude and the second attitude.

In one embodiment, the present invention includes a system for resolving phase ambiguities in phase rate of change (PROC) measurements of a long baseline interferometer (LBI) including an LBI including a first antenna and a second antenna positioned on a vehicle to receive the RF signal transmitted by the RF emitter, and a processor positioned on the vehicle configured to a) determine a first phase rate of change (PROC) of the RF signal received by the LBI over a short time interval to produce a short time interval range estimate of the RF emitter, b) determine a second PROC of the RF signal received by the LBI over a long time interval which is greater than the short time interval to produce a plurality of ambiguous long time interval range estimates of the RF emitter, and c) select one of the plurality of long time interval range estimates based on the short time interval range estimate.

In one embodiment, the processor is configured to select one of the plurality of long time interval range estimates that is closest to the short time interval range estimate. The short time interval and long time interval are set to determine resolve ambiguities in the PROC measurements and determine a distance from the vehicle to the RF emitter within a predetermined error range.

In one embodiment, the processor is configured to determine the PROC measurements by measuring a first phase of the received RF signal with the LBI at a first time, measuring a first attitude of the vehicle with the navigation system at the first time, measuring a second phase of the received RF signal with the LBI at a second time, measuring a second attitude of the vehicle with the navigation system at the second time, and determining a change in phase of the RF signal from the first time to the second time by removing artifact phase changes produced by a change in attitude from the first time to the second time.

In one embodiment, the processor is configured to repeat steps a-c to produce a plurality of selected long time interval range estimates, and determine a location of the RF emitter based on a common intersection between the plurality of selected long time interval range estimates.

In one embodiment, the system includes a short baseline interferometer (SBI) including a third antenna and a fourth antenna positioned on the vehicle to receive the RF signal transmitted by the RF emitter, and the processor is configured to determine an angle of arrival (AOA) of the RF signal received by the SBI, and determine a location of the RF emitter based on a common intersection between the selected long time interval range estimate and the AOA.

It is understood that the foregoing general description and the following detailed description are exemplary, but are not restrictive, of the invention.

BRIEF DESCRIPTION OF THE FIGURES

FIG. 6b), according to an embodiment of the present invention.

DETAILED DESCRIPTION

Figure 1A:
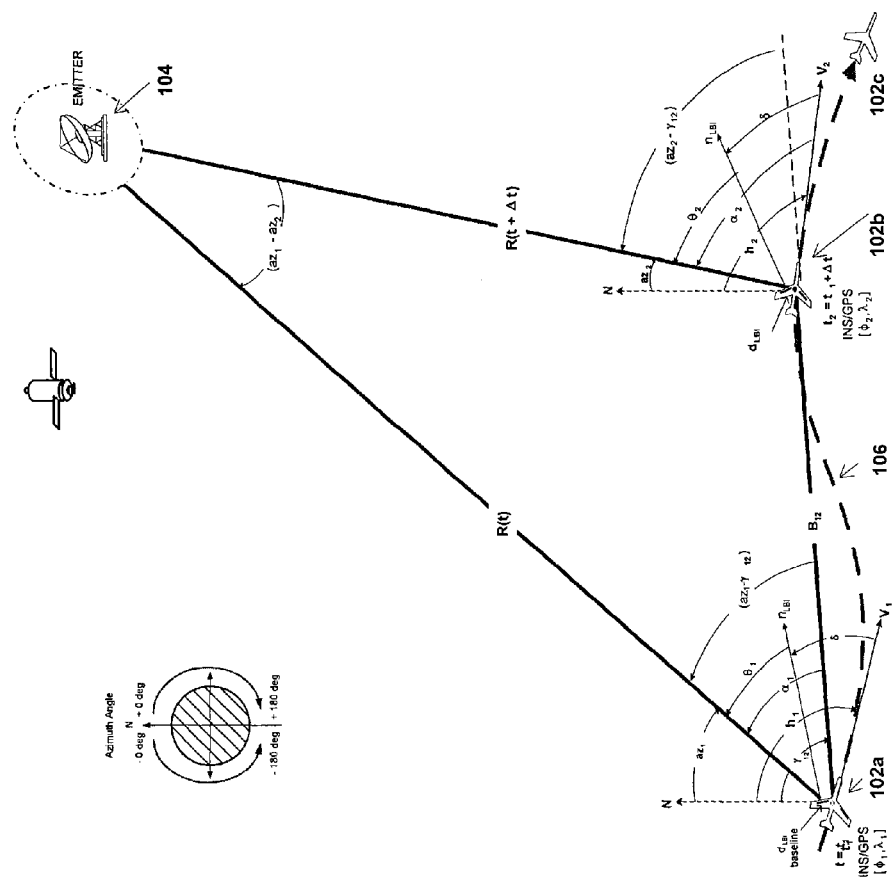
FIG. 1a is a view of a conventional AOA triangulation technique to obtain the range to an RF emitter, according to an embodiment of the present invention.

In general, the present invention relates to a system and associated techniques for passive geo-location of uncooperative RF emitters using phase-rate-of-change (PROC) determinations with a long baseline interferometer (LBI). A novel and practical approach to resolve the ambiguities associated with the LBI PROC determinations is developed and described via modeling/simulation results. Further developments include an algorithm for correction of spurious PROC contributions arising from possible attitude changes of the sensor-platform during time-intervals associated with the PROC determination.

As will be described, the present invention provides a system for determining the geo-location of an RF emitter by computing the phase rate of change (PROC) of a received RF signal by a long baseline interferometer (LBI) array. This invention develops and uses a technique to resolve PROC ambiguity cycles. The technique is based on the use of different time intervals between phase measurements (i.e. a short time interval to resolve ambiguities and longer time intervals to enhance accuracy).

Although different arrangements are possible, one embodiment allows for a large, unobstructed frontal field-of-view (FOV) coverage, and allows for a determination of both the elevation angle (for coning error correction) and a useful estimate of the angle of arrival (AOA). The system also allows multiple LBIs on a single platform for performing simultaneous, geometrically different PROC measurements of the same emitter.

In addition, the present invention is not restricted to single platform applications. Descriptive figures with results obtained via computer modeling show that the PROC technique can be extended to multiple data-linked aircraft.

In general, the SBI sub-system of the preferred embodiment allows for the determination of the azimuth AOA of the signal. The elevation angle is also obtained with the use of the two SBI azimuth-only arrays without the need for dedicated elevation vertical arrays.

Additionally, an algorithm is developed, and presented here, of a procedure to correct spurious contributions to PROC determinations due to platform attitude changes which may occur during subsequent phase measurements. The basic concepts of this invention could be applied to a PROC geo-location system on a moving ground-based vehicle or watercraft, and it can be applied to a broad range of radio frequencies. It is also apparent that the PROC technique implemented on single-platforms with multiple LBI baselines, or implemented in data-linked multiple platforms with LBI baselines, can be used for personnel or vehicle location, target cueing, and multiple platform versions for target hand-off.

Also, an example is provided of a data-filtering algorithm based on the assumption of Gaussian statistics, which leads to a weighted combination of independent determinations of a generic emitter location. Graphic results of this filtering process (i.e. error ellipses) versus measurement time (or number of measurements) are depicted.

In general, FIG. 1a shows a platform 102 (e.g. an airplane) performing AOA triangulation to determine the geo-location of emitter 104 (e.g. an antenna of another stationary platform emitting a radio frequency RF signal). At position 102a, the platform records its own geo-location using global positioning satellites (GPS), and measures the azimuthal AOA of the emitter's radiation. After traveling on path 106, (i.e. at position 102b) the platform again records its own geo-location, and measures another AOA. The platform locations and the AOA's measured by the platform are then used to determine the geo-location of the emitter.

FIG. 1a suggests that triangulations are inaccurate at small subtended angles, which occur if the time-interval between measurements $\Delta t$ is very short, or when the platform is traveling predominantly in the direction of the emitter (creating a small effective baseline normal to the line-of-sight (LOS) for the triangulation). In these cases, the intersection of the lines-of-sight along $R(t)$ and $R(t+\Delta t)$, is ill-defined.

The following information is associated with FIG. 1a:
$\phi_i$, $\lambda_i$=Lat. and Lon. via INS/GPS, $B_{12}$=platform baseline between measurements; az, h=azimuth and heading angles ref. North; $\gamma_{12}$=platform baseline orientation ref. North; $\delta$=orientation of the LBI normal ref. tail-to-nose; $AOA_i = \theta_i = [(az_i - h_i) - \delta]$, angle ref. normal to the interferometer baseline; $\alpha_i = (az_i - \gamma_{12})$=aspect angle ref. baseline $B_{12}$. Flat-earth-approx., $B_{12} = R_{earth} \, [(\phi_1 - \phi_2)^2 + (\lambda_1 - \lambda_2)^2 \cos(\phi_{avg})^2]^{1/2}$, $\gamma_{12} = \arctan[(\lambda_1 - \lambda_2) \cos(\phi_{avg})/(\phi_1 - \phi_2)]$.

A geometric relationship (i.e. the sine theorem) allows for an analytical model including facts which are common to all single-platform passive ranging techniques (i.e., a moving platform traverses the linear baseline, $B_{12} \sim V(t_2 - t_1) = V\Delta t$, of a triangle having an emitter at the apex between range sides $R(t)$ and $R(t+\Delta t)$, and measured azimuthal AOA angles $\theta(t)$, $\theta(t+\Delta t)$). FIG. 1a shows that the subtended angle at the emitter is given by $\Delta az = (\alpha_{t+\Delta t} - \alpha_t) = [(az_{t+\Delta t} - \gamma_{12}) - (az_t - \gamma_{12})]$. Thus, using the sine theorem, the range side $R(t)$, or $R(+\Delta t)$ can be written in terms of measured quantities as follows:

$$R_t = [B_{12} \sin(az_{t+\Delta t} - \gamma_{12})/\sin(az_{t+\Delta t} - az_t)], \text{ or}$$

$$R_{t+\Delta t} = B_{12}(\Delta t) \sin(az_t - \gamma_{12})/\sin(az_{t+\Delta t} - az_t) \quad \text{(Eq. 1.1)}$$

where $\sin(az_{t+\Delta t} - az_t) \approx (az_{t+\Delta t} - az_t)$, because the intervals $\Delta t = (t_2 - t_1)$ between angle measurements are such that $(az_{t+\Delta t} - az_t) \ll 1$ radian ($\sim 57.3°$).

By taking into account angle measurements errors $\epsilon az_t$, $\epsilon az_{t+\Delta t}$, with angle-sensor standard deviation (stdv) $\sigma a$, the above ranging equation provides an expression for the resultant stdv of the range, σR, in conventional AOA triangulations (navigation data and other errors are small in comparison, and for brevity are not shown here), $$(\sigma R_t/R)_{AOA} \sim \sqrt{2}[R_t \sigma a/B(\Delta t) \sin(az_{t+\Delta t} - \gamma_{12})] + \delta \ldots ,$$ (Eq. 1.2)

Equation 1.2, shows the effects of sensor quality σa, time interval Δt through the effective baseline size, B(Δt) sin (az–γ), and range size $R_t$ in conventional AOA triangulations.

Figure 1B:
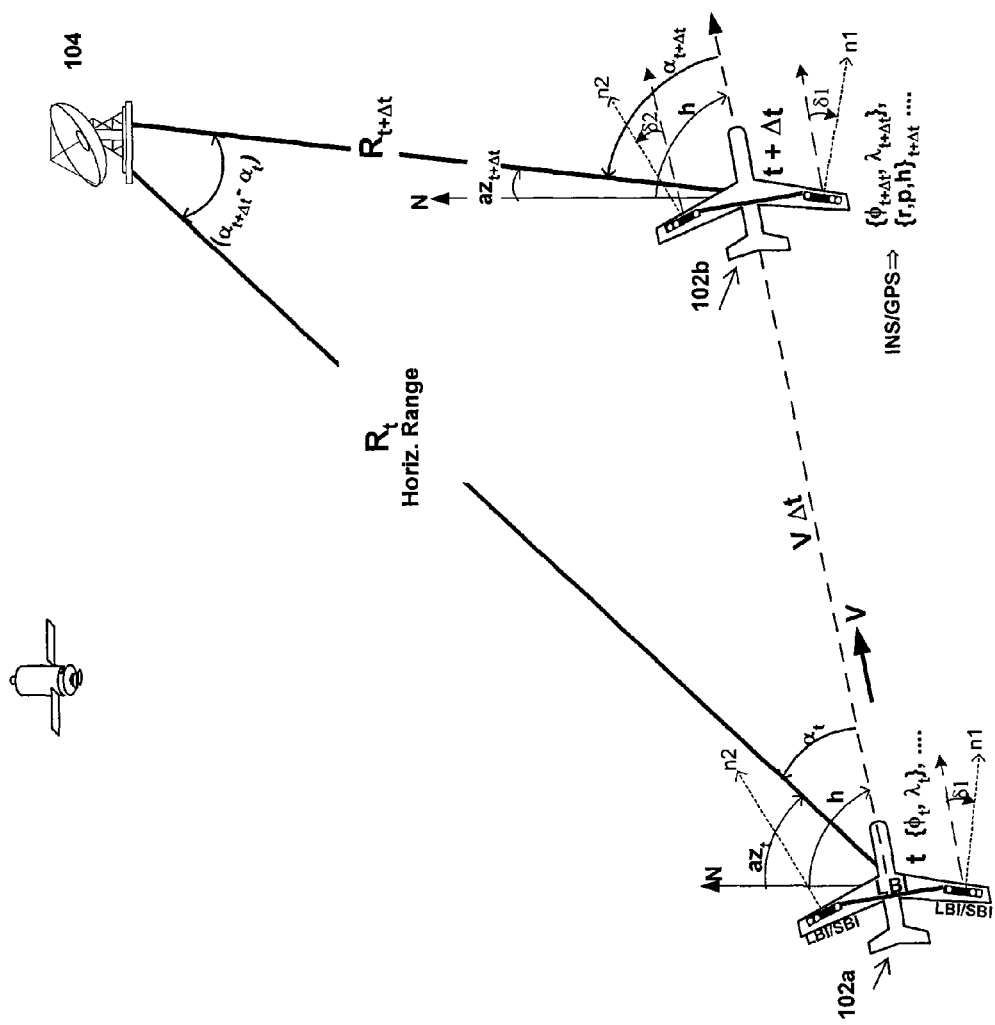
FIG. 1b is another view of AOA triangulation, according to an embodiment of the present invention.

FIG. 1b shows a close up, simplified view of the triangulation geometry (shown in FIG. 1a) where $\gamma_{12}$=heading h, and α=(az–h). The example described in FIG. 1b in conjunction with (Equation 1.2), shows that depending on the angle-sensor standard deviation error, σa, small subtended angles Δaz=[az(t+Δt)–az(t)]=[α(t+Δt)–α(t)] may be overwhelmed by measurement errors. Furthermore, since conventional triangulations normally require that the system be able to collect data on the emitter's signal for many seconds to attain large baselines with concomitant large Δaz, its performance may be degraded by intermittent signals, or terrain obstacles leading to sporadic signal intercepts. A simple numerical example using Eq. 1.2 and FIG. 1b with V=450 Knots ~0.232 Km/s, R=54 NM~100 Km, α=60°, provides an estimate of the angle-rate-of change, dα/dt≈[Vsin(α)/R]~0.002 rad/s~0.11°/s. That is, it takes about Δt~9 seconds to attain, Δα=($\alpha_{t+\Delta t} - \alpha_t$)≈1° and a triangle baseline VΔt≈2 Km. Hence for AOA triangulations to attain accurate results in reasonable short flight-times, precise AOA sensors σα<<Δα may be needed.

It has been discussed that by the use of a Long Baseline Interferometer (LBI, $d_{LBI} \gg \lambda$), the above problems may be eliminated while permitting accurate, indirect measurements of the angle difference Δaz=[az(t+Δt)–az(t)] without the need for LBI frequent phase measurements over long time intervals.

LBI's may not be well-suited as AOA sensors because of the small separation between angle ambiguities, (~λ/$d_{LBI}$) radians. However, LBI's can be used to directly measure phase-rate-of-change (PROC) and indirectly measure the associated angle-rate-of-change. The relation between the phase difference Φ(t) at the elements of an interferometer and the angle-of-arrival θ(t)=(az(t)–h(t)–δ), is given by the familiar expression:

$$\Phi(t)=(2\pi d_{LBI}/\lambda) \cos(el(t)) \sin(az(t)-h(t)-\delta)$$ (Eq. 1.3)

FIG. 1a, shows that (az–h) is the radiation angle-of-arrival ref. the tail-to-nose axis of the aircraft; while δ is the "installation" angle of the LBI normal axis, n, ref the tail-to-nose axis. This figure does not show the relative platform-to-emitter elevation angle, el(t)=arctan(ΔH/R(t)), (ΔH/R)<<1, which for level flights is slowly varying compared with the azimuth angle.

Equation (1.3), also implies that phase changes, ΔΦ$_t$=(Φ(t+Δt)–Φ(t)), may occur due to changes in the AOA during flight, Δθ$_t$=(θ$_{t+\Delta t}$–θ$_t$)=[(az$_{t+\Delta t}$–az$_t$)–(h$_{t+\Delta t}$–h$_t$)]=(Δaz–Δh). For small time intervals Δt between phase measurements, a Taylor series first order approximation is, Φ(t+Δt)–Φ(t)≈(dΦ/dt)Δt+ . . . . Thus, $$\Delta\Phi(t) \approx (d\Phi/dt)\Delta t = (2\pi d_{LBI}/\lambda) \cos(el(t)) \cos(az(t)-h(t)-\delta)(\Delta az - \Delta h),$$ (Eq. 1.4)

where, it was considered that the elevation angle does not change significantly during reasonably small time-intervals between phase measurements.

Note that the phase-change ΔΦ consists of two terms, i.e., ΔΦ=ΔΦ$_T$+ΔΦ$_R$, where the first term is due to platform translation, Δaz=(az$_{t+\Delta t}$–az$_t$), and the second term is due to possible rotational attitude changes of the platform, Δh=(h$_{t+\Delta t}$–h$_t$).

Equation 1.1 which stems from the sine theorem, contains contributions due to platform translation ΔΦ$_T$∝Δaz because rotational attitude changes, (ΔΦ$_R$≈–(2πd$_{LBI}$/λ) cos (el) cos (az–h–δ)Δh), may not modify the subtended angle/baseline B(Δt) of the triangle. The rotational contribution ΔΦ$_R$ can be computed and taken out of the overall measured phase differential ΔΦ by simply using the navigation data Δh provided by the internal navigation system/GPS system.

From Eq. 1.4, we obtain Δaz=(az$_{t+\Delta t}$–az$_t$) from LBI measurements, and it may be substituted in Eq. 1.1, $$\Delta az=(az_{t+\Delta t}-az_t) \approx (\Delta\Phi_t - \Delta\Phi_R)/[(2\pi d_{LBI}/\lambda) \cos(el_t) \cos(az_t-h_t-\delta)].$$ (Eq. 1.5a)

Equation 1.5a, shows that by obtaining angle-rates in terms of LBI phase-rate measurements, the resultant error of the subtended angle Δaz can be written as, $$\sigma\Delta az \approx \sigma\Delta\Phi/[\lambda/2\pi d_{LBI} \cos(el) \cos(az-h-\delta)]$$ (Eq. 1.5b)

Note that for values such as: (λ/$d_{LBI}$)~(1/200), σΔΦ~10°, el~7°, θ~30°; one gets σΔaz~0.01°, which is much smaller than the resultant error obtained from direct angle measurements with conventional SBI's AOA sensors.

By substituting Eq. 1.5a into Eq. 1.1, the Triangulation Equation gets written in terms of the LBI phase-change ΔΦ$_t$=(Φ$_{t+\Delta t}$–Φ$_t$), instead of possible SBI angle measurements at times t and t+Δt. The equation below contains the basic features (ΔΦ$_R$ is subtracted out of the overall measured phase difference ΔΦ$_t$).

$$R_t \approx (2\pi d_{LBI}/\lambda) \cos(el_t)[B(\Delta t) \sin(az_t-\gamma)/(\Delta\Phi_t-\Delta\Phi_R)] \cos(az_t-h_t-\delta)$$ (Eq. 1.6a).

Consider, again, the case depicted in the FIG. 1b, where the platform heading does not change during the measurement time interval Δt, i.e., h$_{t+\Delta t}$=h$_t$=h=γ, thus Δh=0 and ΔΦ$_R$=0; furthermore, B=VΔt, and α=(az–γ)=(az–h)=aspect angle ref tail-to-nose. In this case, Eq. 1.6a simplifies to $$R_t \approx (2\pi d_{LBI}/\lambda) \cos(el_t)[V\Delta t/(\Phi_{t+\Delta t}-\Phi_t)] \sin(\alpha_t) \cos(\alpha_t-\delta), R_t > 0.$$ (Eq. 1.6b)

The ranging Eqs. (1.6a), (1.6b), are now expressed in terms of LBI phase-changes rather than angle measurements (az$_t$ and az$_{t+\Delta t}$) and should be compared with Eq. 1.1. An error equation similar to Eq. 1.2 can be obtained from Eq. 1.6b by taking into account phase measurements errors εΦ$_t$, εΦ$_{t+\Delta t}$, with standard deviation (stdv) σΦ (again, navigation data, LBI-arm error, δ-installation errors, and other errors, which are small in comparison, are not shown below), $$(\sigma R/R)_{LBI} \approx [\lambda/2\pi d_{LBI} \cos(el) \cos(\alpha_t-\delta)][R_t \sigma\Delta\Phi/V\Delta t \sin(\alpha_t)] + \ldots$$ (Eq. 1.7)

A close examination of Eqs. 1.2, and 1.7 in conjunction with 1.6 shows the advantages of ranging via LBI PROC measurements rather than using the conventional AOA triangulation method. Equations 1.7 and 1.2 show that the magnitude of the range error (σR/R)$_{LBI}$ is smaller than (σR/R)$_{AOA}$, and accurate range determinations can be obtained via LBI in shorter measurement times. Furthermore, in addition to the small LBI factor (λ/$d_{LBI}$), in Eq. 1.7; the phase differential ΔΦ$_t$=(Φ$_{t+\Delta t}$–Φ$_t$), because of phase subtraction, is free from most of the bias errors usually associated with cable imbalances in long arm interferometer-based systems.

Figure 1C:
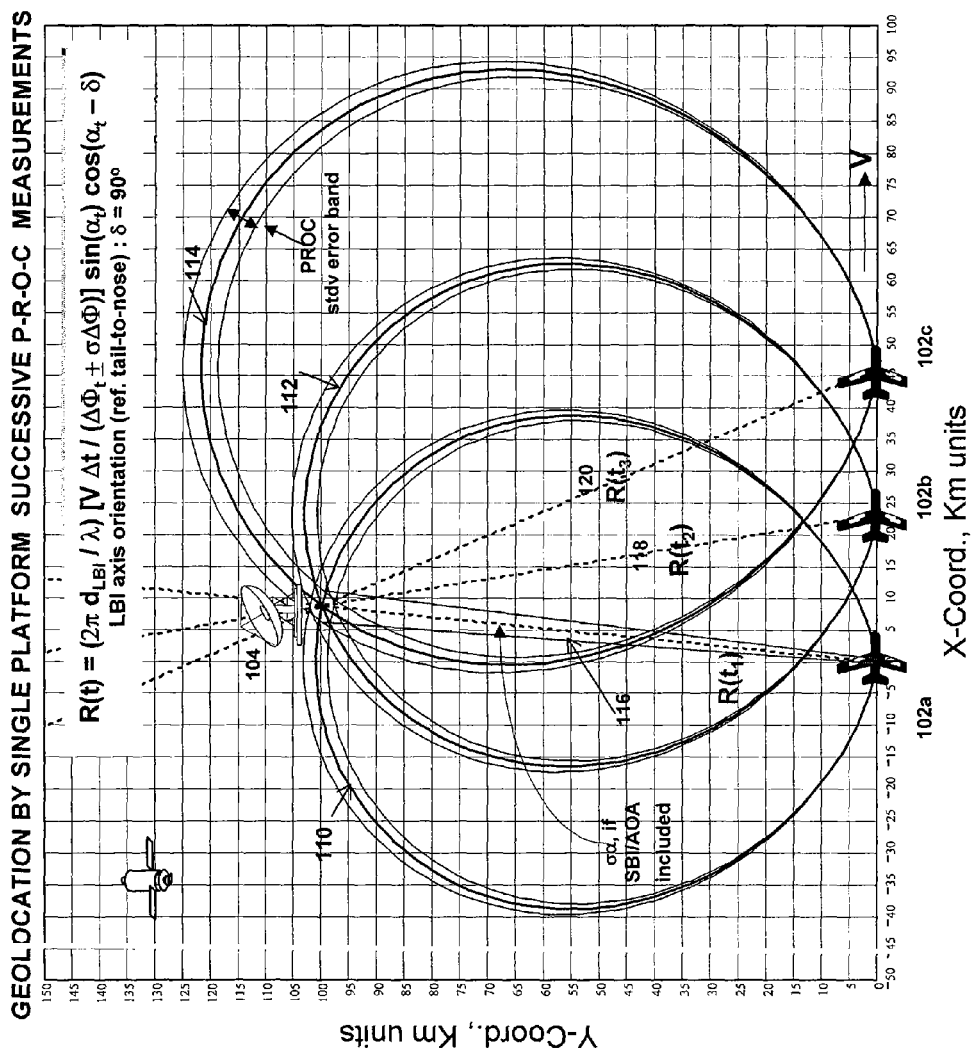
FIG. 1c is a view of PROC measurements by a single platform, according to an embodiment of the present invention.

FIG. 1c shows successive PROC measurements made via LBI, by the platform 102. A first PROC lobe 110 is computed when the platform is in position 102, a second PROC lobe 112 is computed when the platform is in position 102b, and when the platform is in position 102c, phase measurements for a third PROC lobe 114 are performed. It is noted that PROC lobes 110, 112, 114 intersect near the geo-location emitter 104, providing three independent geo-locations of the emitter 104.

FIG. 1c shows two methods of determining the emitter's location. First, an AOA sensor, e.g., an SBI, with $d_{SBI}$~a few $\lambda$'s, could be added to the LBI antenna array by simply including an extra antenna element to be used with one of the LBI antenna elements. This would allow the AOA (e.g. 116, 118 and 120) to be measured. A quick emitter location would then be at the intersection of the PROC curve and the AOA radial as FIG. 1c indicates. Second, if AOA information is not available, additional PROC measurements can be made after the host aircraft has moved further in the flight path. In this case, the emitter location would be at the intersection of several PROC lobes as previously discussed. FIG. 1c depicts LBI PROC curves as bands, mainly because of phase measurement errors. However, recall that Equation 1.7 indicates that the standard deviation (stdv) of range errors, $\sigma R$, depends on R, $(\lambda/d_{LBI})$, $\sigma\Delta\Phi$, the aspect angle, and the interval $\Delta t$ between measurements, (i.e., the baseline size). FIG. 1c also suggests that an statistically filtered geo-location of the emitter may improve with time with a rate that depends on the parameters of the system and measurement errors. If an SBI AOA sensor is included, a first-cut (range and angle) location can be quickly determined (i.e. the small factor $(\Delta/d_{LBI})$ diminishes the range error $\sigma R_{LBI}$ which is described by the half-width of the PROC "curve"), while the cross-range error is given by (R $\sigma\alpha$), where $\sigma\alpha$ is the AOA sensor stdv, (i.e., $\sigma\alpha \approx (\lambda/2\pi d_{SBI}) [\sigma\Phi/\cos$ (el) cos ($\alpha$)], e.g., if $(d_{SBI}/\lambda)$~5, $\sigma\Phi$~7°, $\alpha$~45°, $\sigma\alpha$~0.3°).

Figure 1D:
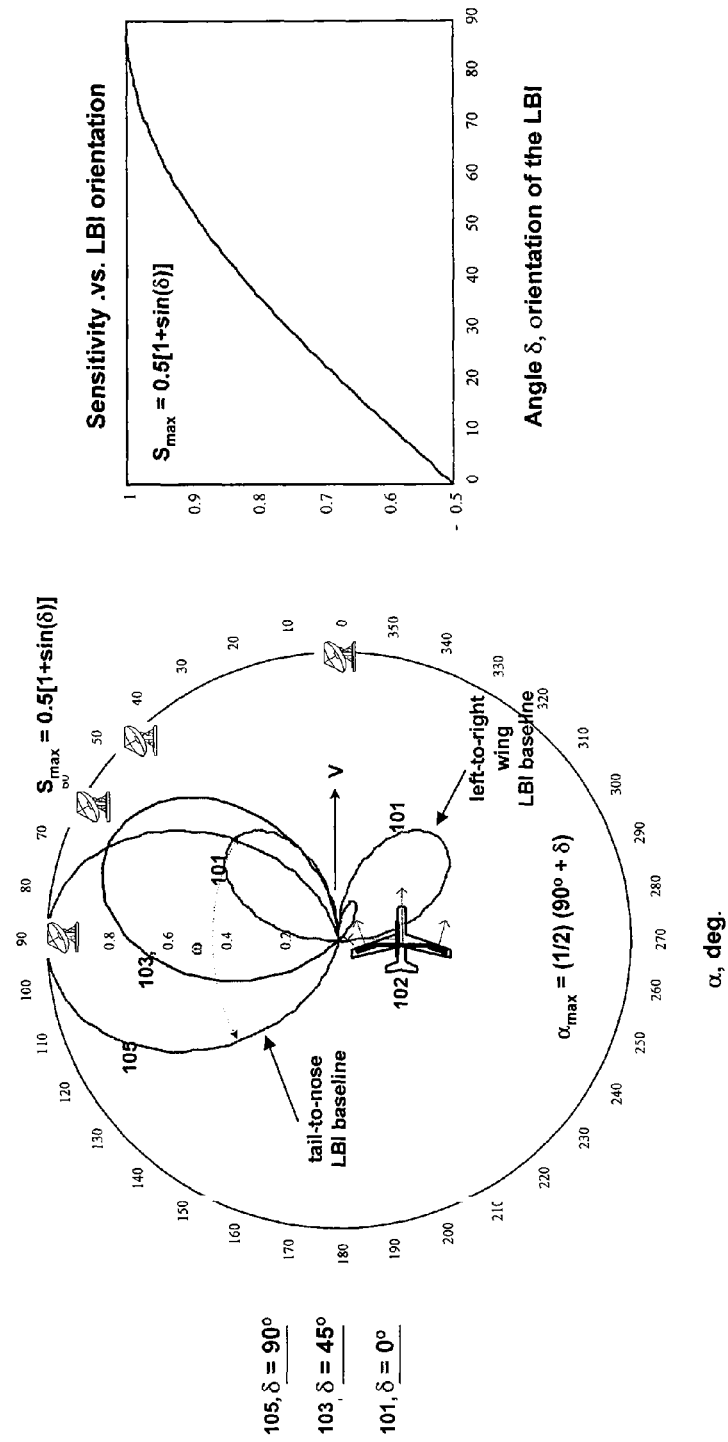
FIG. 1d is a view of PROC sensitivity curves versus the orientation of the long baseline interferometer (LBI), according to an embodiment of the present invention.

FIG. 1d depicts sensitivity-curves for a few different LBI orientations, these are angular regions where far-field radiation from an emitter leads to phase-rate-of-change (PROC) measurements. Note that the curves graphically account for a fact common to triangulation methods: one cannot measure range in the direction of the platform motion ($\alpha$=0), or along the interferometer baseline ($\alpha$=$\delta$). The lobe 105 is associated with a tail-to-nose interferometer baseline, while the lobe 103 is obtained with a baseline at 45°, and the lobe 101 is associated with the baseline at 90°.

Figure 2A:
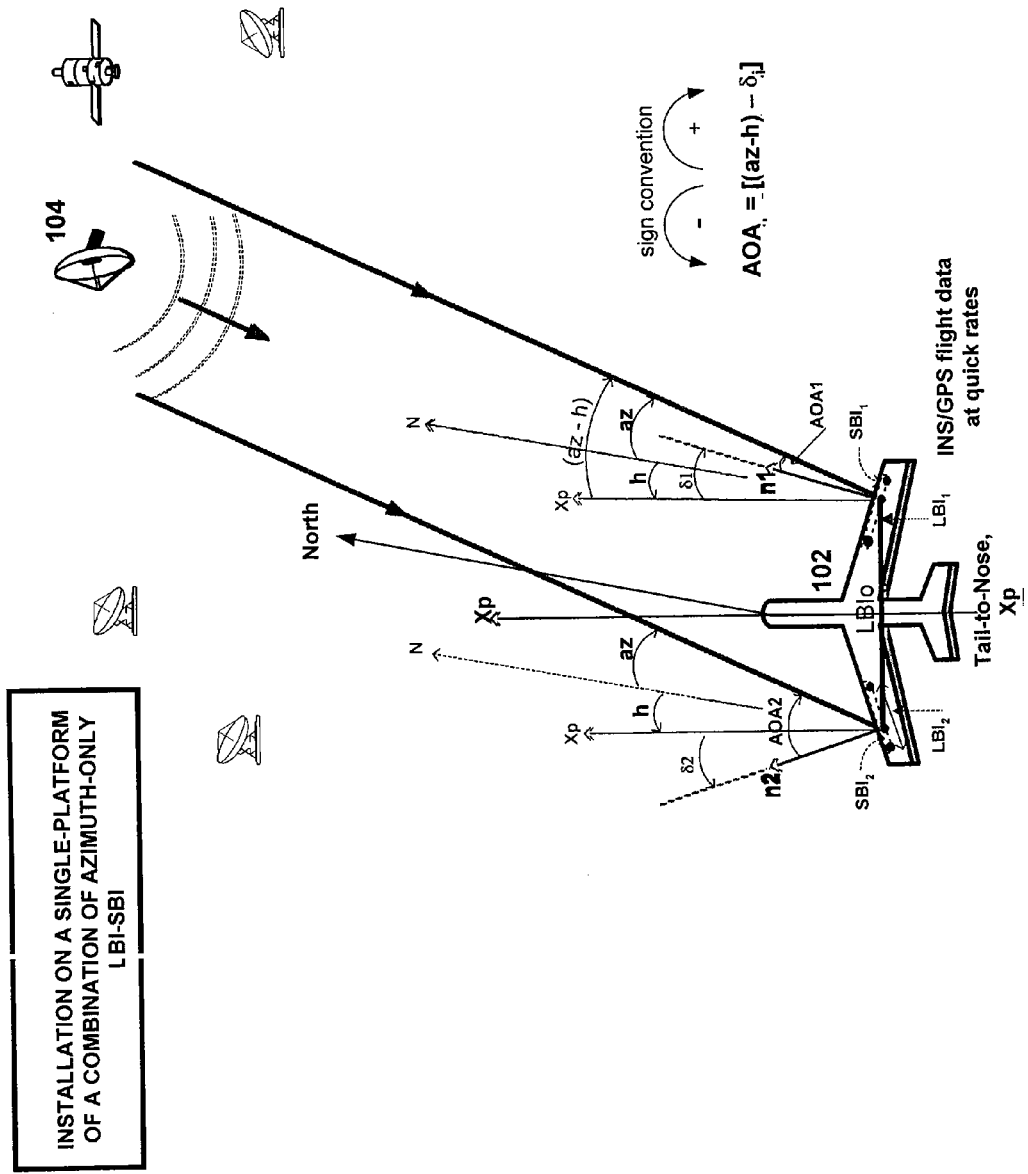
FIG. 2a is a view of an installation of an azimuth-only short baseline interferometer (SBI) and a long baseline interferometer (LBI) system on a single platform, according to an embodiment of the present invention.

To study the geo-location effectiveness of this invention, modeling/simulation work was performed with the embodiment shown in FIG. 2a. The figure shows different antenna element combinations which lead to platform installation of azimuth-only LBI's with different orientations of their normal axes. That is, LBIo with $\delta$=0, $LBI_1$ with $\delta \approx +30°$, and $LBI_2$ with $\delta \approx -30°$. In addition, AOA sensors are considered by including a pair of extra antenna elements allowing for independent, short baseline interferometers $SBI_1$ and $SBI_2$ ($d_{SBI}$~a few $\lambda$'s). It is noted that different arrangements are possible, and this embodiment was selected to make more apparent the essential concepts of the disclosure.

The configuration shown in the FIG. 2a allows for a large, unobstructed frontal field-of-view (FOV) coverage. In addition, by using the procedure disclosed in our U.S. Pat. No. 6,784,840 B2, the elevation and azimuth angles can be obtained by using the azimuth-only combination of $SBI_1$ and $SBI_2$. The elevation angle, el(t)=arctan($\Delta H/R(t)$)$\approx$ ($\Delta H/R(t)$)<<1 rad, enters as cos (el) in Eqs. 1.3-1.7. Furthermore, mathematical modeling shows that this embodiment, or a similar setup, enables a single aircraft to simultaneously perform multiple independent PROC measurements by using $\{LBI_1$ and $LBI_2\}$, and/or $\{LBI_0$ and $LBI_1\}$, and/or $\{LBI_0$ and $LBI_2\}$. Simultaneous PROC and AOA measurements $\{LBI_k, SBI_i\}$ are also possible, (see FIG. 1c).

The range determining Equation 1.6a and 1.6b are based on LBI measurement of the phases $\Phi(t)$ and $\Phi(t+\Delta t)$ separated by a short time interval ($\Delta t$). Phases are measured modulo-$2\pi$ with results in the interval ($-\pi$, $+\pi$). The interferometer Equation 1.3, $\Phi(t)=(2\pi d_{LBI}/\lambda)$ cos (el) sin ($\alpha(t)-\delta$), shows that because $(d_{LBI}/\lambda)$>>1 for LBI's, these measurements are often ambiguous and the integer phase-cycle, n=trunc($\Phi/2\pi$), remains undetermined. Since the true phase $\Phi(t)$, and the measured mod-$2\pi$ phase, m$\Phi(t)$, are related as follows, $$\Phi(t) = m\Phi(t) + 2\pi n(t), \text{ where, } n(t) = \text{trunc}(\Phi(t)/2\pi) = 0, \pm 1, \pm 2, \pm 3, \quad \text{(Eq. 2.1)}$$

Thus, the relation between the true PROC and determined PROC adopts the form $$[\Phi(t+\Delta t) - \Phi(t)] = [m\Phi(t+\Delta t) - m\Phi(t)] + \quad \text{(Eq. 2.2)}$$
$$2\pi[n(t+\Delta t) - n(t)] =$$
$$= [m\Delta\Phi(t) + 2\pi\Delta n(t)]$$

Note that while the cycle number, $n_t$=trunc $[(d_{LBI}/\lambda)$ cos (el) sin ($\alpha_t-\delta$)], associated with the phase $\Phi_t$ could be a large integer, the magnitude of the "ambiguity-jump" integer, $\Delta n_t = (n_{t+\Delta t} - n_t)$, is normally smaller. The magnitude of $\Delta n_t$ mainly depends on the time $\Delta t$ between PROC-determining phase measurements. That is, for small $\Delta t$'s, the angle-of-arrival, and concomitant phase $\Phi_t$ may not change much during the interval (t, t+$\Delta t$). Thus, the ambiguity-jump $\Delta n$ is zero (unambiguous), or a small integer such as $\pm 1$. However, for larger $\Delta t$'s the magnitude of the ambiguity-jump $\Delta n_t$ increases because of larger AOA changes during the platform motion.

An estimate of the time-interval value, $\Delta t^*$, needed for a differential phase-jump to occur can be obtained via Eq. (1.6b) written in the form, $$(\Phi_{t+\Delta t} - \Phi_t) \approx (2\pi d_{LBI}/\lambda) \cos (el_t)[V\Delta t/R_t] \sin (\alpha) \cos (\alpha_t - \delta) \quad \text{(Eq. 2.3)}$$

That is, by substituting $(\Phi_{t+\Delta t} - \Phi_t)$ with its one-cycle-jump value, $2\pi$ radians, one gets $\Delta t = \Delta t^*$ as, $$\Delta t_t^* \approx [\lambda/d_{LBI} \cos (\alpha_t - \delta) \cos (el_t)]/[V \sin (\alpha_t)/R_t],$$
$$\Delta t^* > 0, \quad \text{(Eq. 2.4)}$$

The first square bracket of Equation 2.4 stand for an approximation to the angle-separation between interferometer ambiguities, while the second square bracket (i.e., the denominator), stands for the rate-of-change of the platform-to-emitter aspect angle. Thus, Equation 2.4, admits a simple physical interpretation.

As an example, consider parameter values such as, $(d_{LBI}/\lambda)$=200, R>50 Km, V=0.232 Km/s$\approx$450 Kts, el$\approx$6°. Thus, if $\delta$=0° and $\alpha$=45° one gets $\Delta t^*$~2.2 sec., while if $\delta$=45° and $\alpha$=65°, one gets $\Delta t^*$~1.3 sec. The above discussion and estimates suggest that in order to minimize ambiguity-jumps, i.e. $|\Delta n_t| \leq 1$, one should consider small time-intervals between phase measurements (e.g., $\Delta t$~1 sec.); that is, $$\Delta t_t < \Delta t_t^* \quad \text{(Eq. 2.5)}$$

Equation (1.7) for $(\sigma R/R)_{LBI}$, and the above equations, 2.4 and 2.5, show that there is a conflict/tension between achieving good ranging accuracy by using large subtended triangle baselines (i.e., large $\Delta t$'s) and the need to minimize ambiguity-jumps by using small time-intervals ($\Delta t$'s) between phase measurements.

Figure 2B:
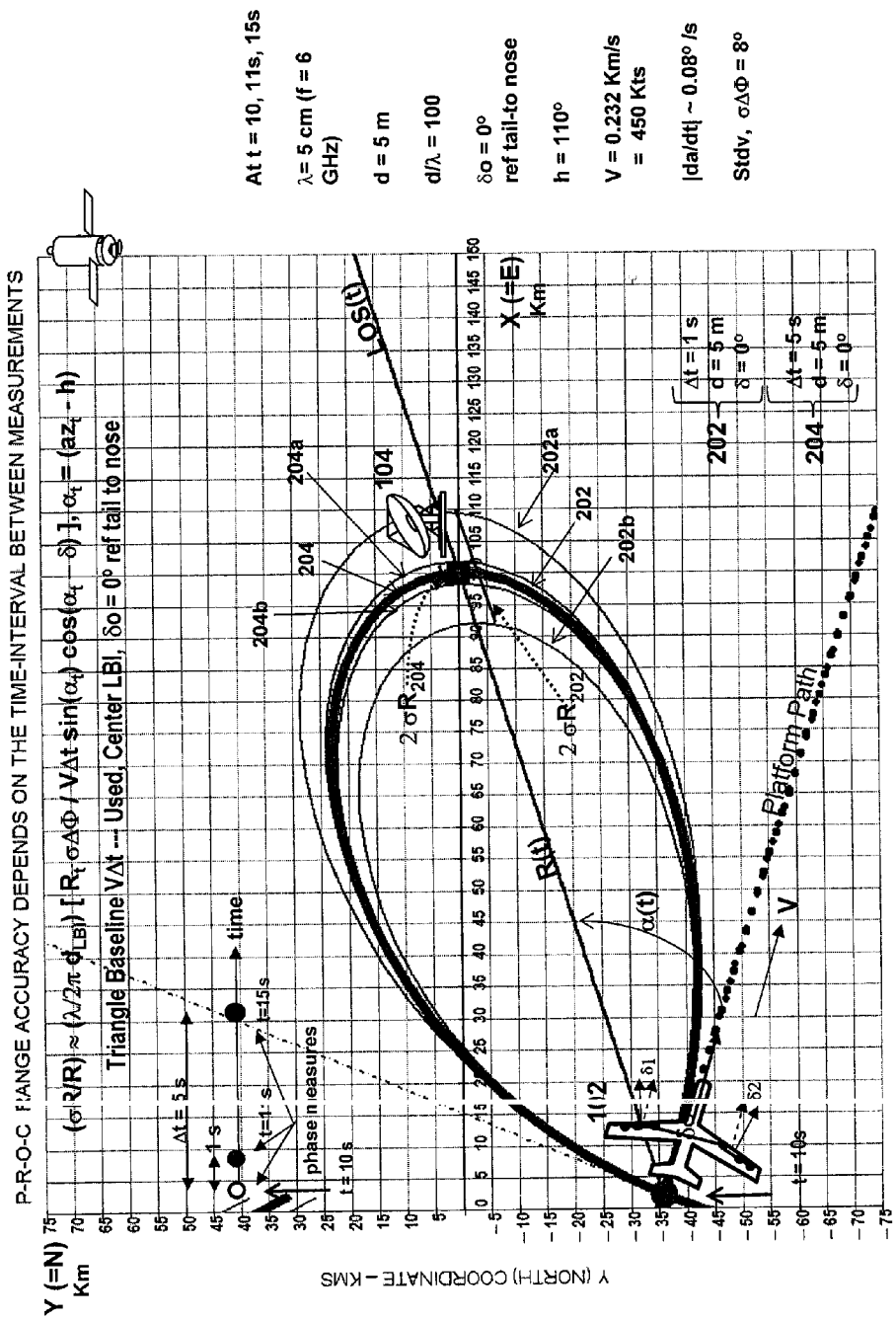
FIG. 2b is a view of PROC measurements by a single platform, according to an embodiment of the present invention.
Figure 2C:
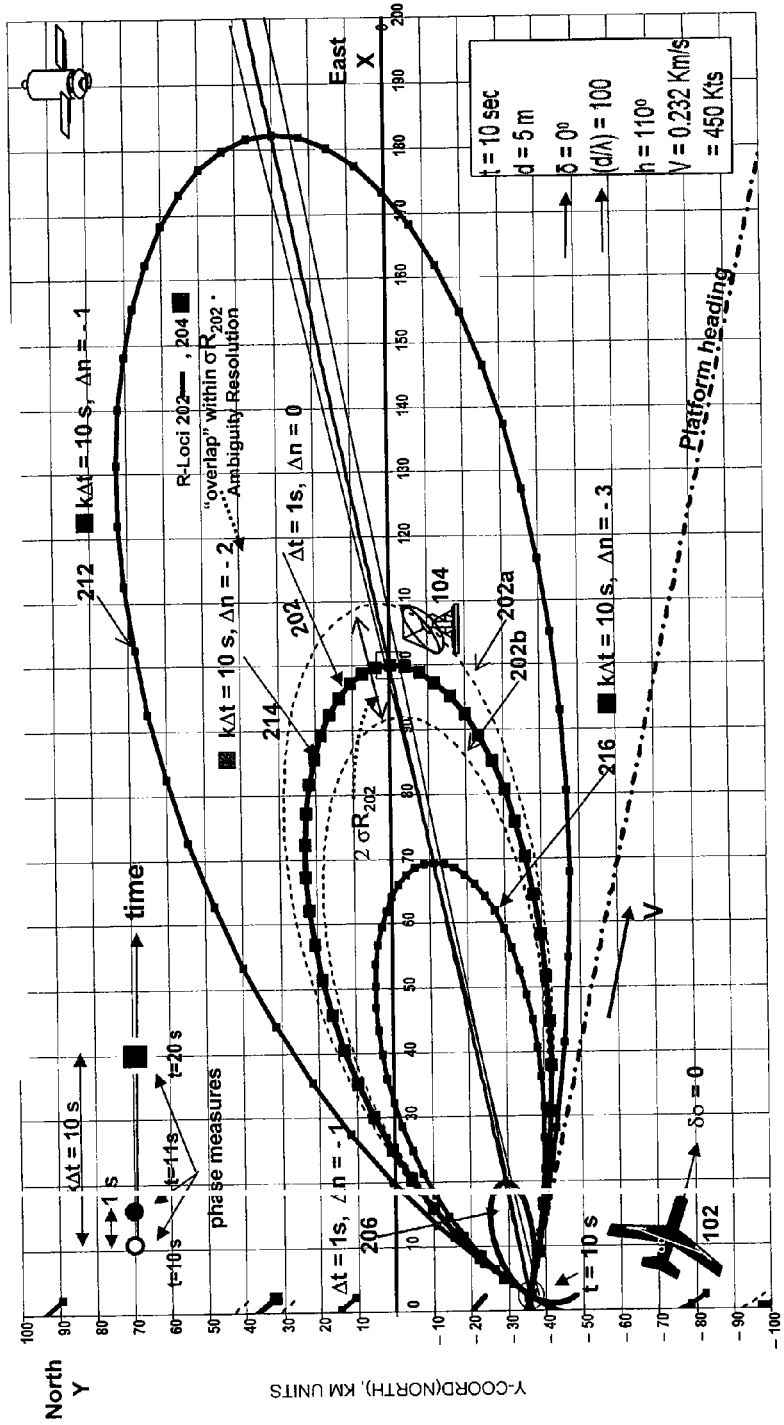
FIG. 2c is a view of resolving ambiguities in PROC determinations made by a single platform, according to an embodiment of the present invention.
Figure 2D:
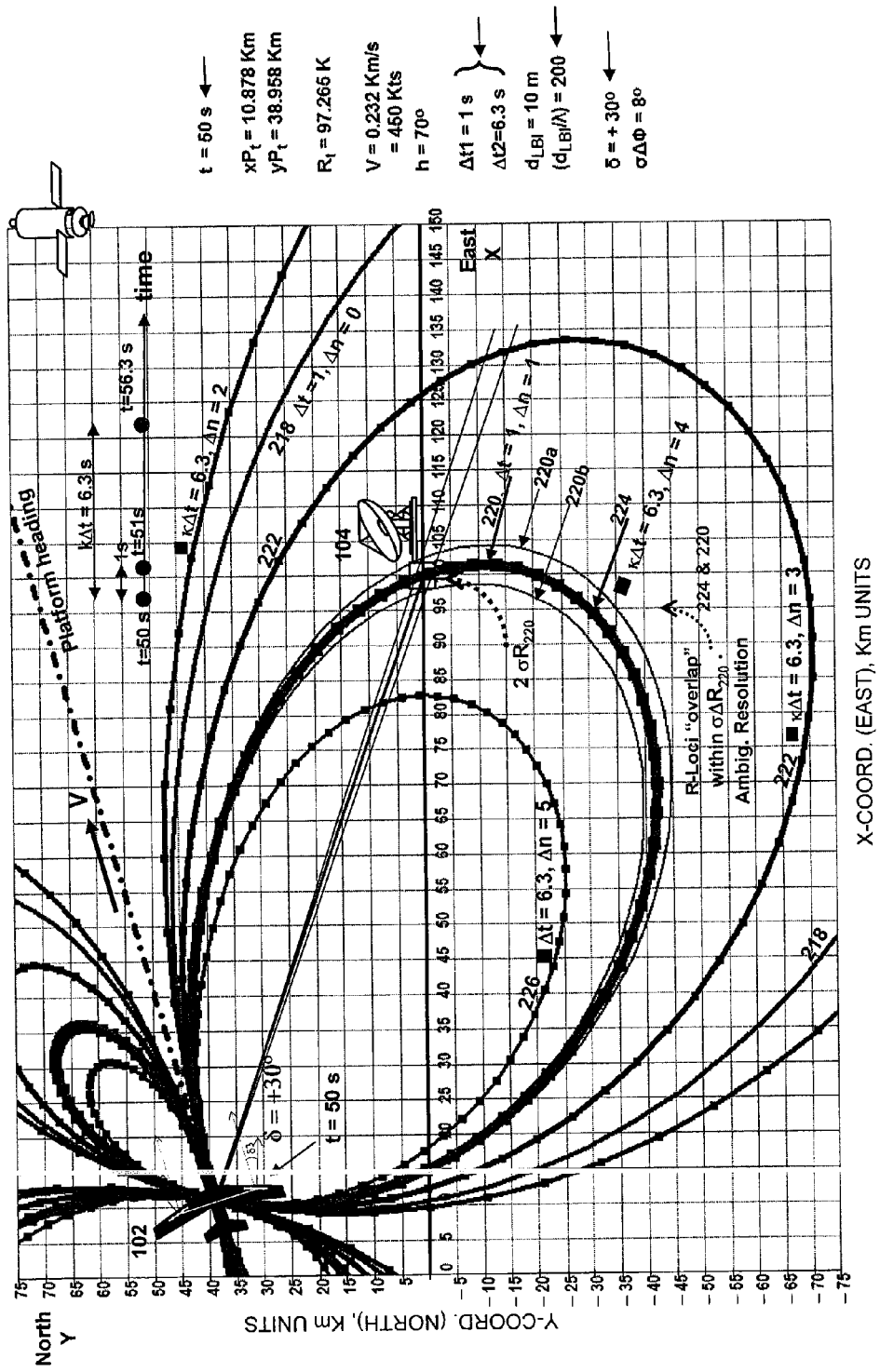
FIG. 2d is another view of resolving ambiguities in PROC determinations made by a single platform, according to an embodiment of the present invention.

Next, the approach that it is used by the present invention disclosure to solve the above mentioned, accuracy vs. ambiguity conflict is described with respect to FIGS. 2b, 2c, 2d. To obtain FIGS. 2b, 2c, 2d, our mathematical model was used to simulate one or two generic platform(s), with a setup as shown in FIG. 2a. The aircraft, during its flight, is performing phase measurements versus time by using an LBI with a fixed orientation, δ=0°, or δ=30°, and other relevant parameter choices. The model calculates the range-loci at generic times during the flight (e.g., t=10 sec, or t=50 sec . . . ) via an equation similar to 1.6b, where the true phase-change is substituted by the measured phase-change $m\Delta\Phi \pm \epsilon\Delta\Phi$, plus the differential cycle contribution, Δn, as described by Equation 2.2. That is, by using $(\Phi_{t+\Delta t}-\Phi_t)=[m\Delta\Phi_t+2\pi\Delta n_t]\pm\epsilon\Delta\Phi$, Equation (1.6b) is written as $$R_t=(2\pi d_{LBI}/\lambda) \cos (el_t)[V\Delta t/(m\Delta\Phi_t+2\pi\Delta n_t)] \sin (\alpha_t) \cos (\alpha_t-\delta).$$ (Eq. 2.5b)

In our simulation, measurements are given Gaussian error contributions arising from random number generators with an adequate standard deviation (stdv), e.g., $\sigma\Delta\Phi \sim 8°$. The FIG. 2b intends to graphically show the effect of the measuring time-interval Δt on LBI ranging accuracy. FIG. 2b depicts a platform performing PROC measurements starting at t=10 seconds with Δt=1 s, and Δt=5 sec. The center $LBI_o$ (δ=0°) was used with a ratio $(d_{LBI}/\lambda)$=100. Because of phase measurement errors ($\sigma\Delta\Phi \approx 8°$), the graph also shows the Gaussian widths of the uncertainty rage bands versus angle. Note the different widths of the σR bands, (i.e., σR~0.1R, and σR~0.02R) associated with the PROC determination time-intervals Δt=1 s and Δt=5 s respectively. The range-lobes 204, 204a, 204b are associated with the phase measurement interval Δt=5 s, while the lobes 202, 202a, 202b are associated with the interval Δt=1 s.

The procedure used to resolve ΔΦ ambiguities, i.e., to determine the differential cycle number $\Delta n_t$ is shown in the FIGS. 2c and 2d. If small time intervals between phase measurements are relied on, an unambiguous range is obtained, but the accuracy may be deficient. If longer time-intervals between phase measurements are relied on, better accuracy is attained, but several possible (ambiguous) ranges may result. Hence, by sequentially using two or more different time-bases (see FIG. 2c) ranges ambiguities may be resolved, and accurate ranges may be obtained.

The range-curve 202, of FIG. 2c, and its associated uncertainty lobes 202a and 202b i.e., (R±σR), stem from phase measurements separated by a short time interval Δt=1, Δn=0 (see also FIG. 2b). A lobe such as 206 also associated with Δt=1, (but Δn=−1), is rejected because it provides a small range answer (e.g., R~20 Km). FIG. 2c, also shows the range-loci associated with the longer time interval Δt=10 s (i.e. 212 (Δn=−1), 214 (Δn=−2), and 216 (Δn=−3)). Because of the scaling, the uncertainty bands for 214, 216 are not visible, or not depicted here (e.g., they are narrow and "coincide" with the range curve).

FIG. 2c shows that the range-curve from the longer time interval which is closest to the short time interval unambiguous range-lobe will most likely be the correct one. An implied criterion for acceptance, of a close agreement between the lobes is apparent; that is, the half-width, σR, of the uncertainty band associated with the short time interval unambiguous range-curve should be smaller than one-half the separation between neighboring ambiguous range-lobes associated with long time interval.

The overall procedure may be summarized as follows. LBI phase measurements are taken at times t, (t+Δt) and (t+kΔt), k>1. The interval Δt should be small enough to make ΔΦ(t, Δt) close to unambiguous, i.e., Δn(t, t+Δt)=0, ±1, while the magnitude of k>1 should be selected based on the desired range accuracy. Next, the system compares the lobes associated with the phase-changes ΔΦ(t, Δt)=[Φ(t+Δt)−Φ(t)]= [mΔΦ+2πΔn(t, Δt)], and ΔΦ(t, kΔt)=[Φ(t+kΔt)−Φ(t)]= [mΔΦ+2πΔn(t, t+kΔt)]. The differential cycle Δn(t, t+kΔt) is determined by the quasi-overlapping lobe falling inside the accuracy band associated with ΔΦ(t, Δt)±σΔΦ.

FIG. 2d shows another example for resolving PROC ambiguities. In this example, the phase measurements are performed with the right-wing LBI (δ=+30°), and ratio $(d_{LBI}/\lambda)$=200. Here, the LBI phase measurements are "aligned" with t=50 s, t=51 s., and t=56.3 s (i.e. Δt=1 s, and kΔt=6.3 s). Note that in both cases, FIGS. 2c and 2d, the sign of Δn is consistent with the convention-stipulated-sign of the AOA during the measurement interval. The short time interval, Δt=1 s, produces range lobes 220 (Δn=1), and 218 (Δn=0), while 220a and 220b account for the uncertainty band associated with 220 (the graph does not include other uncertainty bands). FIG. 2d indicates that phase measurements separated by the time Δt=6.3s allow for several "range-acceptable" lobes. However, lobes 224 (Δt=6.3 s, Δn=4) and 220 (Δt=1 s, Δn=1) have a close overlap within the related uncertainty band $\pm\sigma R_{220}$.

Figure 3A:
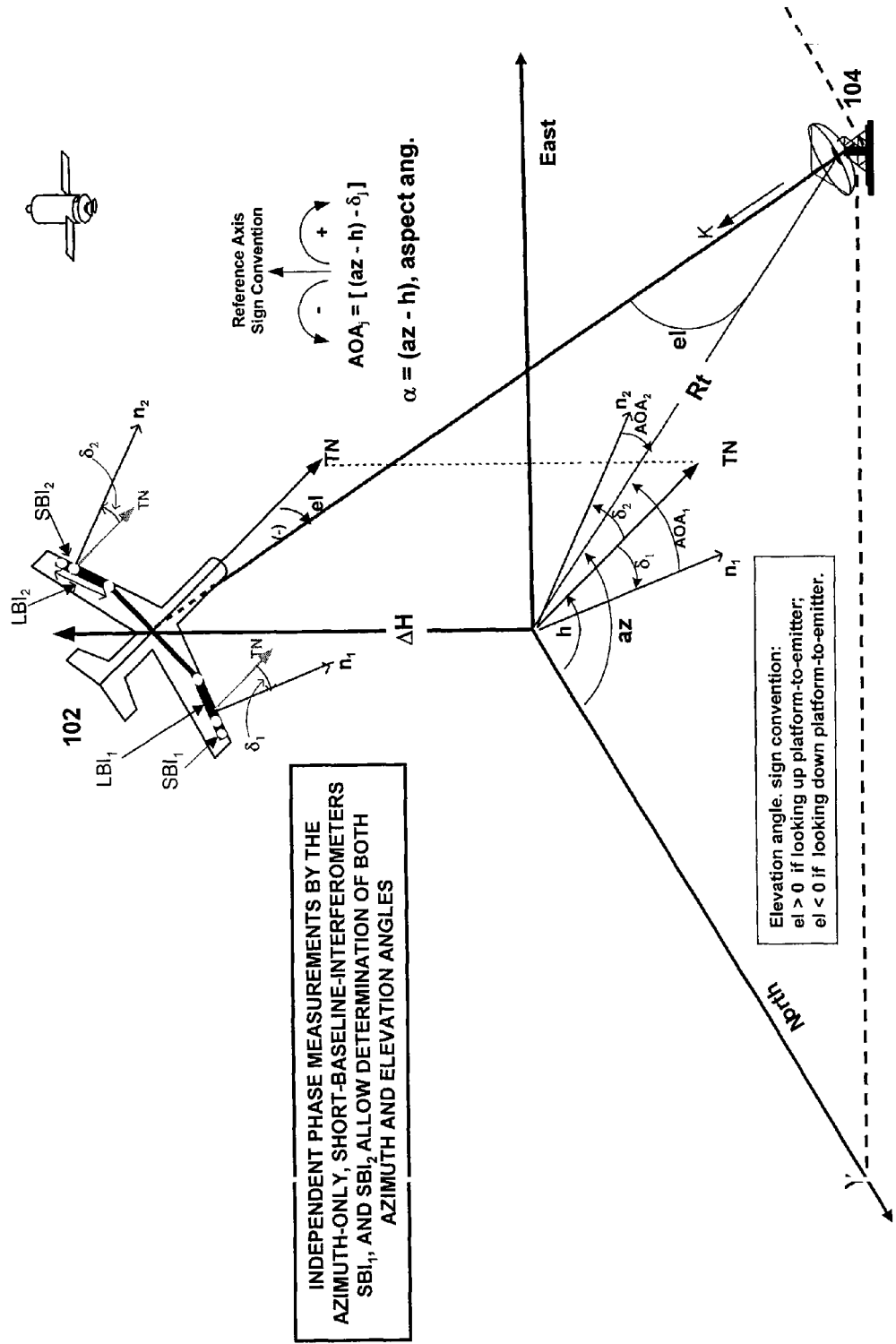
FIG. 3a is a view of the elevation angle from a platform to an emitter, according to an embodiment of the present invention.

The elevation angle el(t), as shown in FIG. 3a, may be helpful to correct the coning error associated with measurements by the azimuth-only LBI arrays. In some cases, the elevation angle can be estimated by simply using NAV platform altitude data Hp, and the emitter's digital-terrain-elevation-data (DTED), He. That is, when the topography is available, el=arctan [(Hp−He)/R]=arctan(ΔH/R), can be obtained. However, in most cases, a direct measurement of the elevation angle may be beneficial. The following is a procedure to measure the elevation angle without the need of a vertical array which involves using the platform embodiment described in the FIG. 3a.

FIG. 3a, shows the elevation angle between platform (102) to emitter (104). First, note that the elevation angle during a platform near horizontal level flight, is slowly varying compared with the azimuth az, or aspect angle α=(az−h). Consider a quick estimation, since $(\Delta H/R_t)<<1$, $\tan(el_t)=(\Delta H/R_t)\approx el_t$; then $(\Delta el/\Delta t)\approx(\Delta H/R_t^2)(\Delta R/\Delta t)\approx(\Delta H/R_t)\times(V/R_t)$. Furthermore, the rate of change of the aspect angle is related to the normal component of the velocity, i.e., $(\Delta\alpha/\Delta t)\approx(V/R_t) \sin (\alpha_t)$. Hence, for typical values such as $R_t$~100 Km, ΔH~10 Km, and $\alpha_t$~60°, one gets, el≈0.1 rad≈6°, and $[(\Delta el/\Delta t)/(\Delta\alpha/\alpha t)]\approx 0.10$. This example, suggests that sparse elevation measurements in conjunction with tracking of the elevation, should prove to be sufficient for coning error correction since $\Delta(\cos (el))\approx -\sin (el)(\Delta el)\approx el\times(\Delta el)$ radians.

The platform embodiment depicted both in the FIGS. 2a, 3a, allow for azimuth and elevation determination, without the use of vertical arrays, and by means of simultaneous, unambiguous phase measurements with the left-wing and right-wing azimuth-only SBI's. The following relates to FIGS. 3a to 3c. Consider a platform flight with a simple attitude. i.e., roll=0, pitch=0, and heading h≠0. Independent phase measurement by $SBI_1$ and $SBI_2$ at a generic time, t, can be expressed as:

$$\Phi_{SBI1}=(2\pi d_{SBI1}/\lambda) \cos (el) \sin (az-h-\delta_1),$$ (Eq. 3.1a)

$$\Phi_{SBI2}=(2\pi d_{SBI2}/\lambda) \cos (el) \sin (az-h-\delta_2).$$ (Eq. 3.1b)

From the above equations one can write two functional equations for the unknown azimuth az(el) in terms of the ambiguity-resolved SBI measurements ($\Phi_{SBI1}$, $\Phi_{SBI2}$) and the unknown elevation angle el:

$$az(el)_1=h+\delta_1+a \sin [(2\pi d_{SBI1}/\lambda)\Phi_{SBI1}/\cos (el)],$$ (Eq. 3.2$^a$)

$$az(el)_2=h+\delta_2+a \sin [(2\pi d_{SBI2}/\lambda)\Phi_{SBI2}/\cos (el)],$$ (Eq. 3.2a)

The above equations depend on well-known parameters (h, $\delta_i$), the SBI phase measurements, $\Phi_{SBI1}$, $\Phi_{SBI2}$ and the unknown elevation angle, el(t). A plot of the two curves $az(el)_1$, $az(el)_2$.vs. a set of possible elevation values may cross at a point, $\{az_t \pm \sigma\Delta$, and $el_t \pm \sigma el\}$.

Figure 3B:
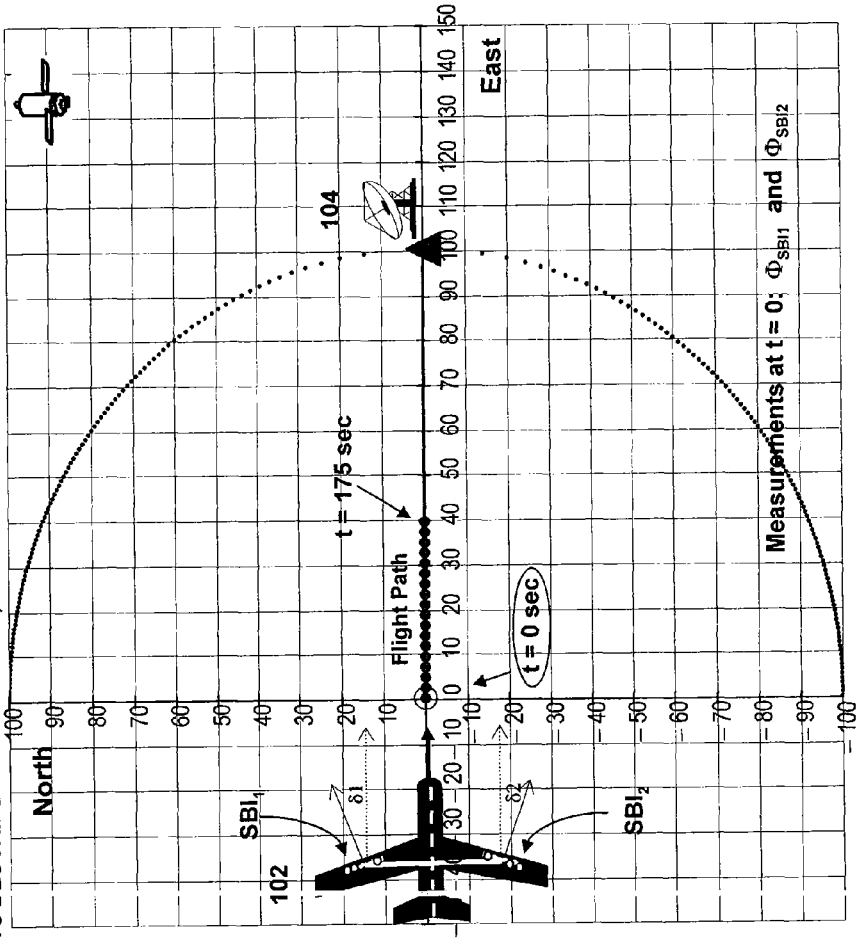
FIG. 3b depicts a simple flight-path example used in the determination of the elevation angle by the SBI system, according to an embodiment of the present invention.
Figure 3C:
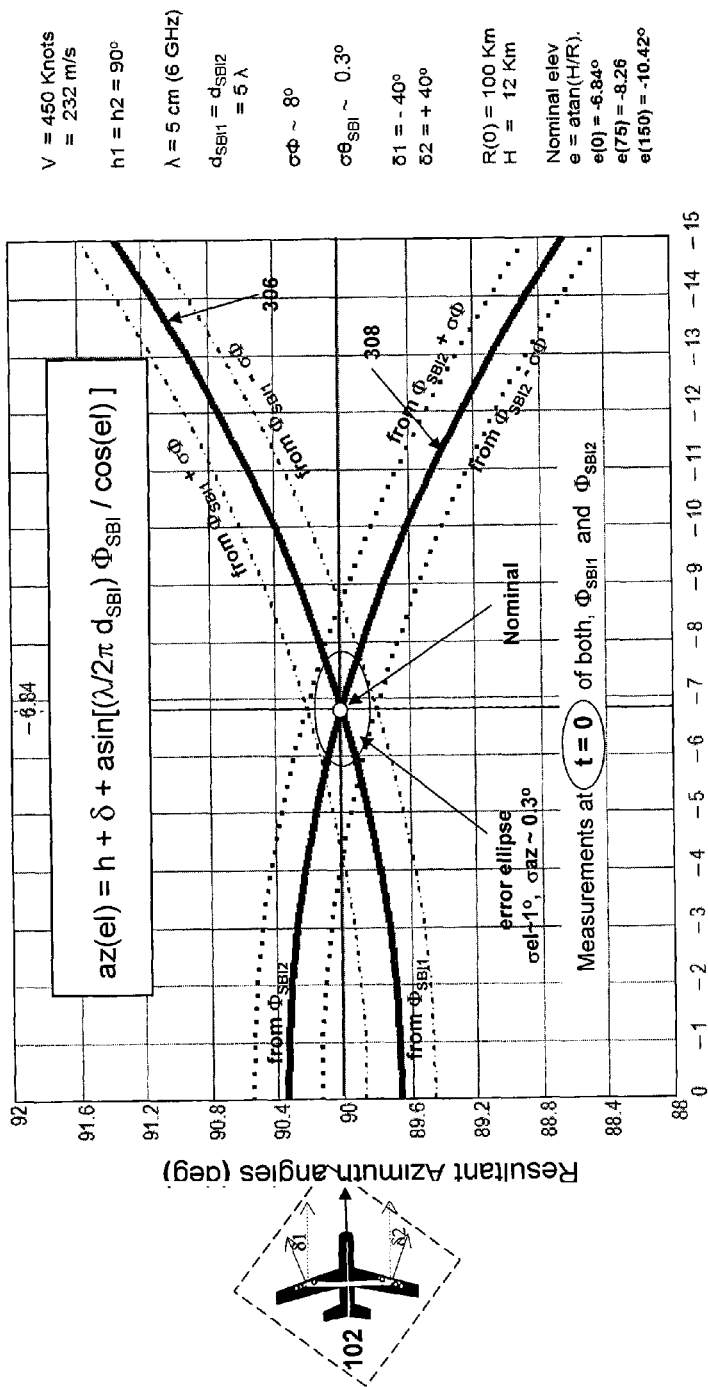
FIG. 3c is a view of determining elevation angle from a platform to an emitter using a system of two azimuth-only SBIs, according to an embodiment of the present invention.

A numerical result obtained via our computer model is shown in the FIGS. 3b and 3c, with relevant parameter values attached to the figures. FIG. 3b shows the platform's flight path and the involved azimuth-only $SBI_1$ and $SB_2$, where $d_{SBI} \sim 5\lambda$, and $\delta_1 = -40°$, $\delta_2 = +40°$ ref tail-to-nose. FIG. 3c shows the intersection of the two curves $az(el)_1$ and $az(el)_2$ with the uncertainty bands to account for phase measurement errors with $\sigma\Phi \sim 8°$ The elevation angle as determined by the intersection of the curves 306 and 308 has a degree of uncertainty mainly because of phase measurement errors. In our case, while the nominal elevation is el(t=0)=a tan (H/R(t=0))=6.84° (~0.12 rad), the figure indicates that $\sigma el \sim 1°$ (~0.02 rad). The quantity needed for correction of the coning error is cos (el), and while its nominal value is cos (6.84°)=0.993, the associated error would be about $\sigma(\cos(el))=\sin(el) \sigma el \sim el \sigma el \sim 0.002$.

Figure 4A:
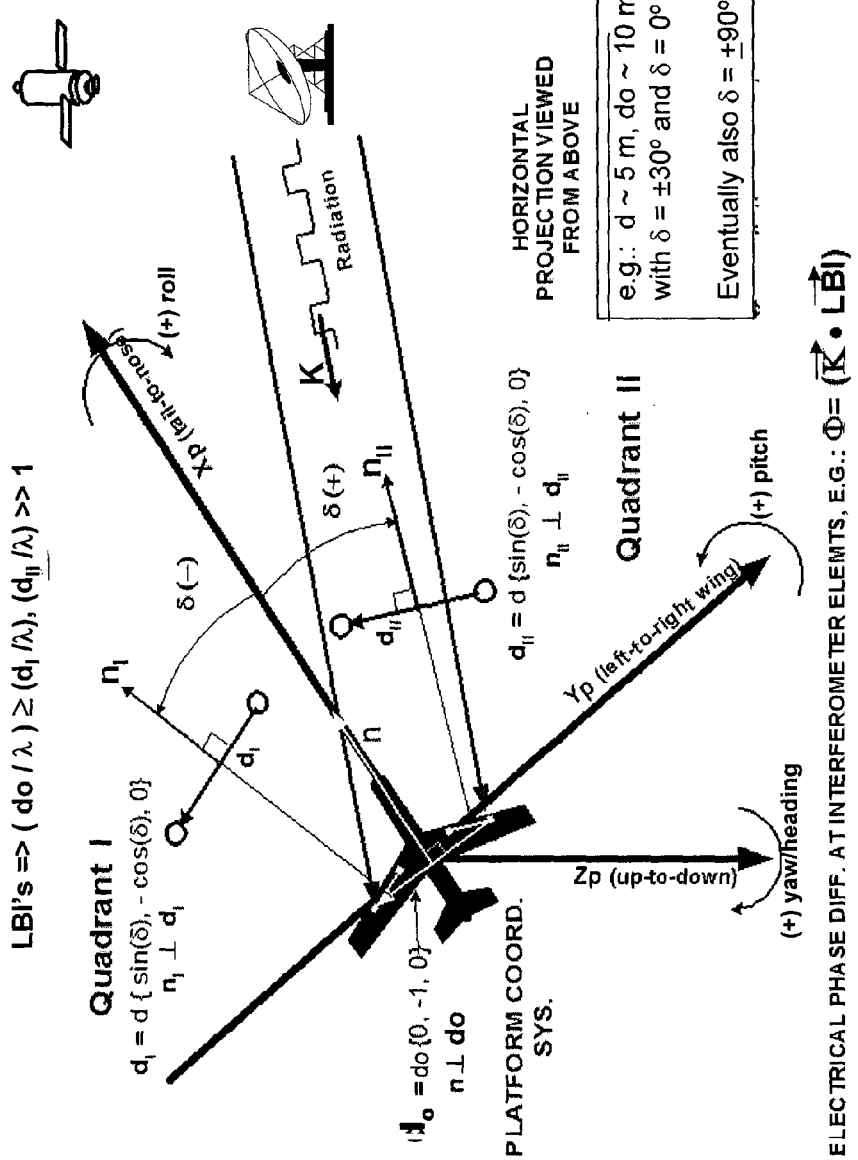
FIG. 4a is a view of multiple LBIs on a platform and their vector components in the platform's reference frame, according to an embodiment of the present invention.

FIG. 4a considers the advantages of using three LBI's on a single platform. That is, four or more antenna elements (depending on the platform), or already existing antenna elements oriented as to conform pairs of elements that can be used as LBI's to determine intersecting PROC solutions. Combining results obtained from different LBI's, provides an unambiguous geo-location solution in a short period of time, and with the use of a single-platform.

Figure 4B:
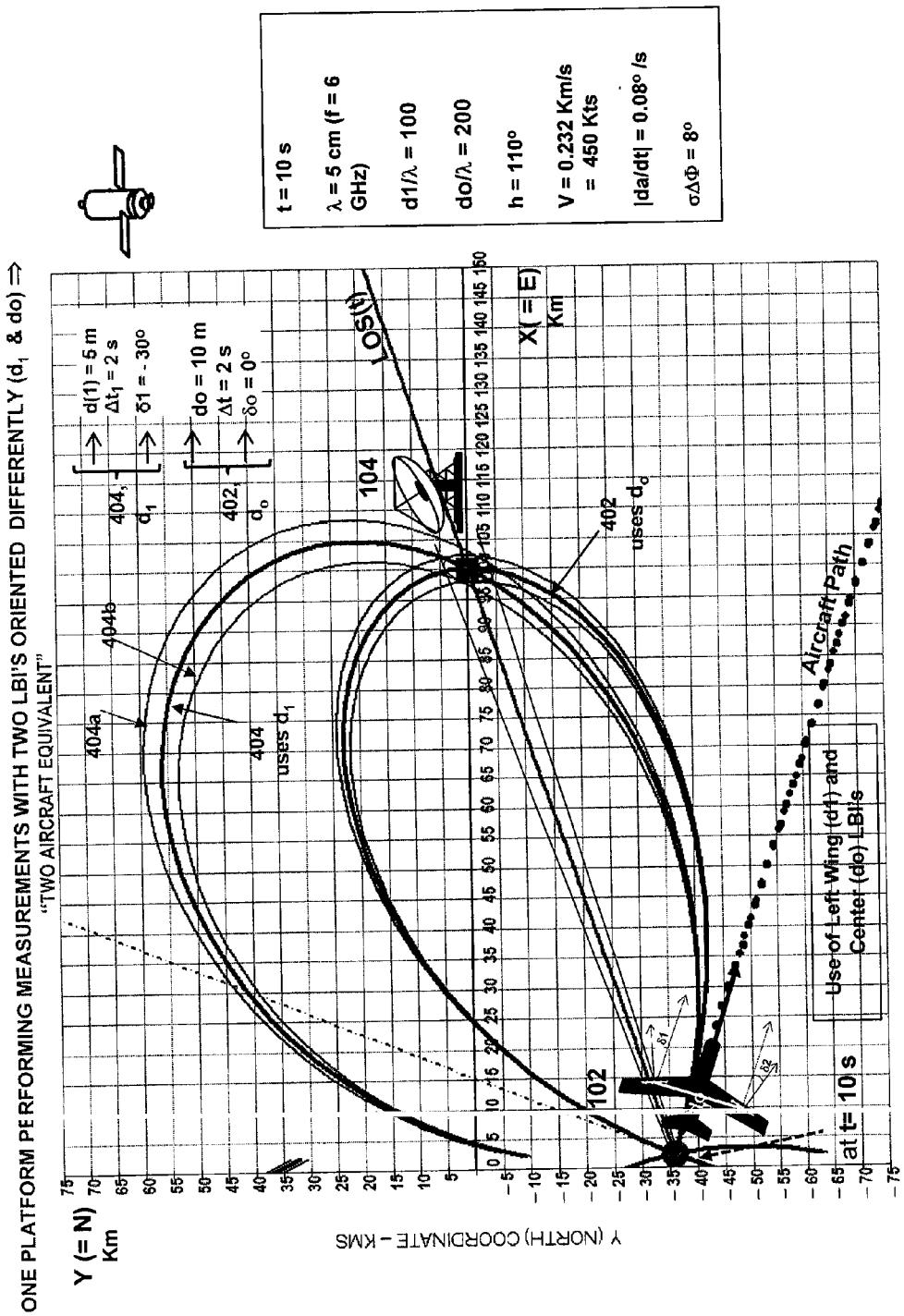
FIG. 4b is a view of PROC measurements from a single platform using its left wing LBI, and its center LBI, according to an embodiment of the present invention.

For example, FIG. 4b shows the use of the left-wing LBI ($\delta=-30°$, $d_{LBI1}=5$ m, $\lambda=0.05$ m) and center LBI ($\delta=0°$, $d_{LBIo}=10$ m, $\lambda=0.05$ m) to determine the emitter location by range-lobe intersection (i.e. intersection of lobes 402 and 404). Note that the range lobes have slightly different accuracy ($d_1$ orientation is more favorable than the orientation of do), and $(do/\lambda)=2 (d1/\lambda)$. Provided that radiation reaches their FOV, it is apparent that in addition to $\{d1, do\}$, there are two extra LBI combinations and associated PROC lobes, which, for brevity, are not shown here. That is, $\{d1, d2\}$ and $\{do, d2\}$ for a total of three pairs of intersections. The geo-location accuracy associated with each intersecting pair is different because of the different intervening LBI orientations and different ratios ($d_{LBI}/\lambda$). A weighted statistical combination of the independently determined locations provides a final, and more accurate geo-location of the emitter. It is apparent that a single-platform, equipped as described, is performing multiple PROC determinations, and delivering emitter location results as they would be obtained by using independent platforms LBI-equipped.

The present invention is not restricted to single-platform scenarios. There are cases where the FOV and relative geometry in a single platform-emitter scenario (see FIGS. 4a and 4b) is non optimal and would benefit by the use of two or more similarly equipped data-linked platforms.

Figure 5A:
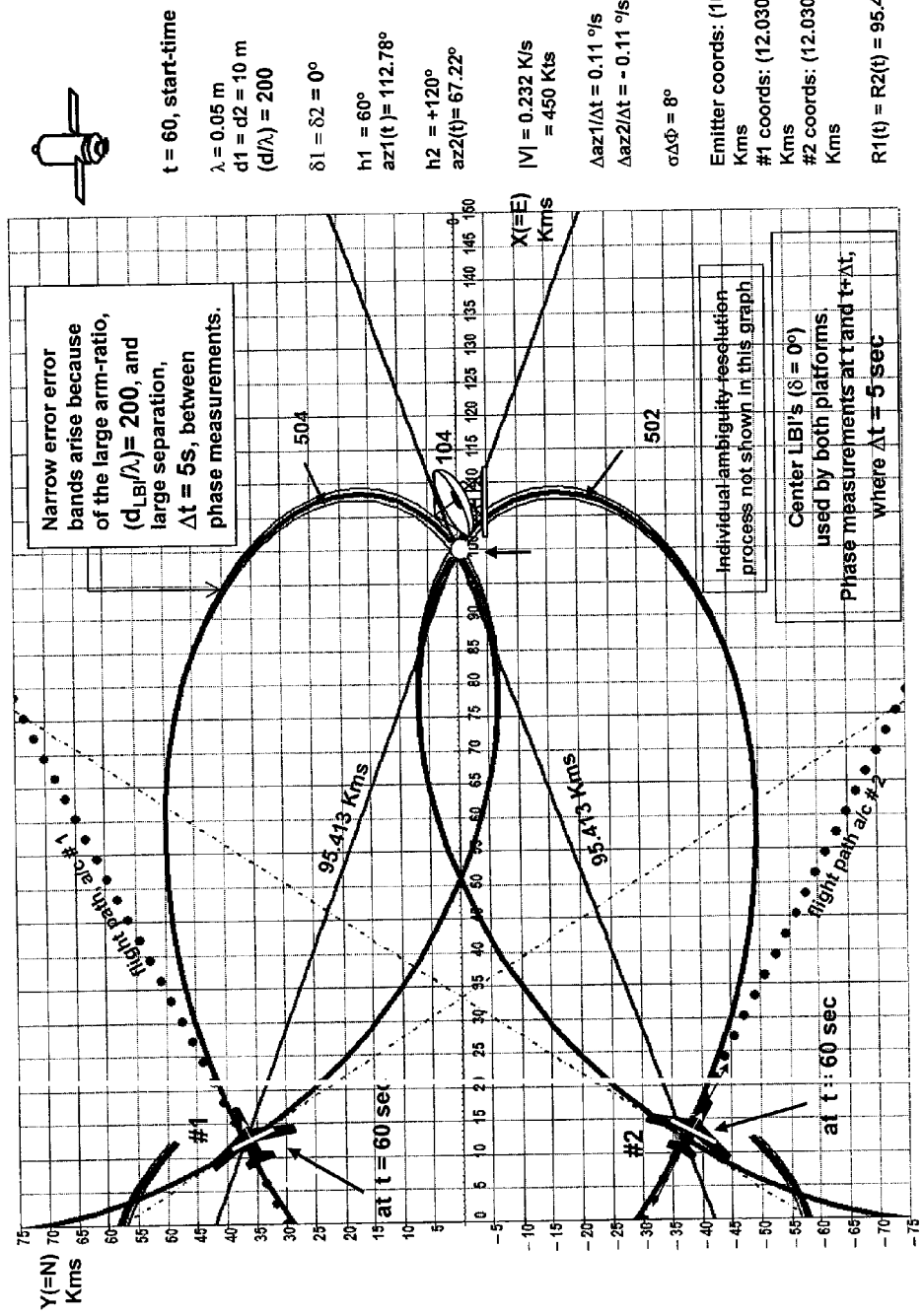
FIG. 5a is a view of PROC measurements from two data-linked platforms, according to an embodiment of the present invention.
Figure 5B:
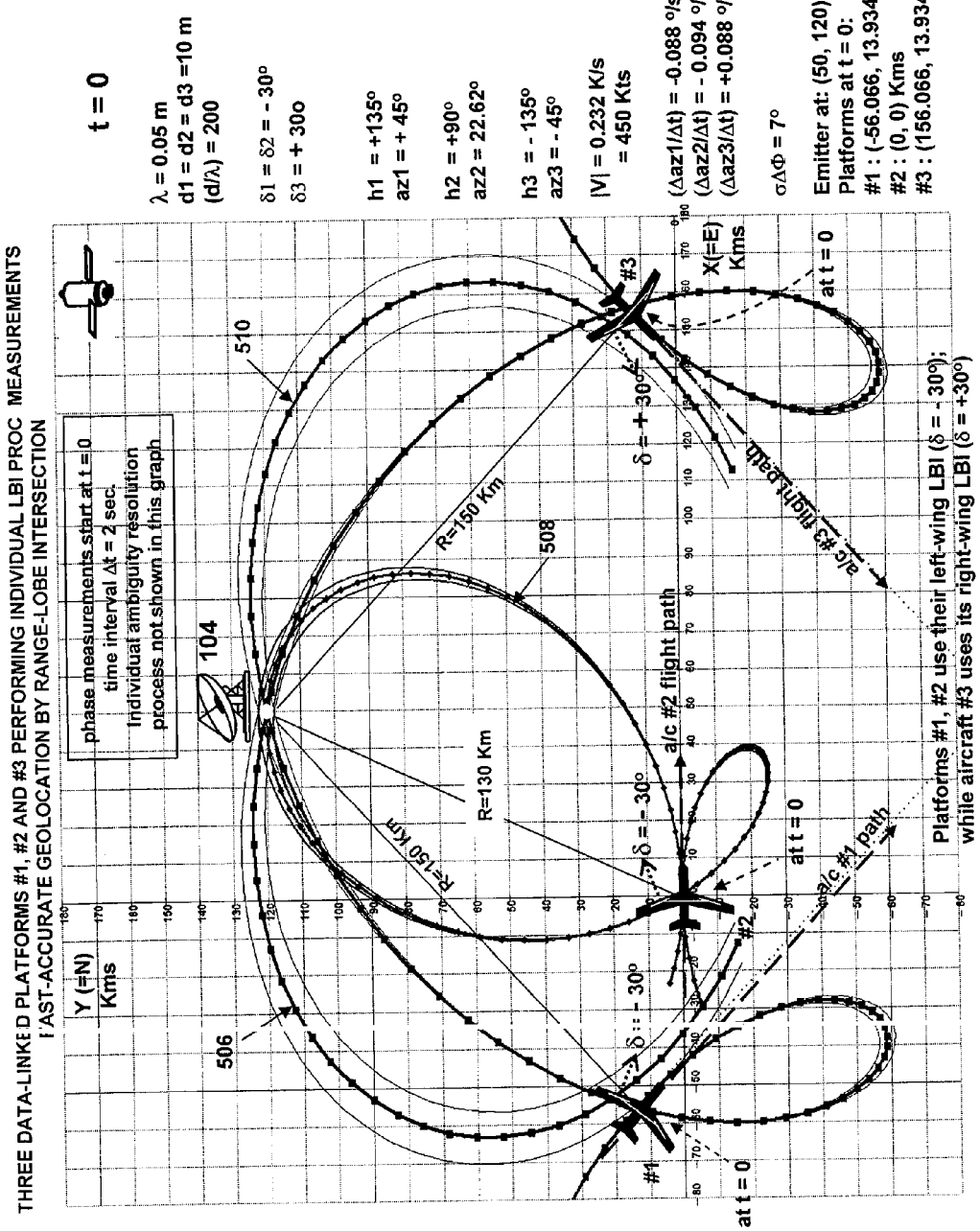
FIG. 5b is a view of PROC measurements from three data-linked platforms, according to an embodiment of the present invention.

Descriptive results obtained with our computer model of the PROC technique extended to multiple data-linked platforms are depicted in the FIGS. 5a and 5b. For example, FIG. 5a shows two data-linked platforms #1 and #2 which perform individual PROC measurements which are then combined to determine the intersection of lobes 502 and 504. Similarly, FIG. 5b shows three platforms #1, #2 and #3, and their individual PROC measurements which are then combined via data-link to determine the intersection of lobes 506, 508 and 510.

Note that in the FIG. 5a center LBI's were used with a selected parameter $(d_{LBI}/\lambda)=200$, while in the FIG. 5b, a set of wing LBI's, also with a selected ratio $(d_{LBI}/\lambda)=200$, were used. The uncertainty band associated with 508 is narrow—compared with 506 and 510 because of a more favorable FOV orientation of the LBI and a slightly closer range During the discussion leading to the approximate equations 1.4 to 1.6, it was indicated that the true phase-change $\Delta\Phi=(\Phi(t+\Delta t)-\Phi(t))$ may consist of two contributions: $\Delta\Phi=(\Delta\Phi_T+\Delta\Phi_R)$. One term, $\Delta\Phi_T$, is due to the platform translational motion during the measuring interval (t, t+$\Delta t$), i.e., $\Delta az=(az_{t+\Delta t}-az_t)$, while the other term, $\Delta\Phi_R$, is due to platform rotational attitude changes, i.e., roll, pitch and heading changes, $\Delta r=(r_{t+\Delta t}-r_t)$, $\Delta p=(p_{t+\Delta t}-p_t)$, $\Delta h=(h_{t+\Delta t}-h_t)$.

Figure 6A:
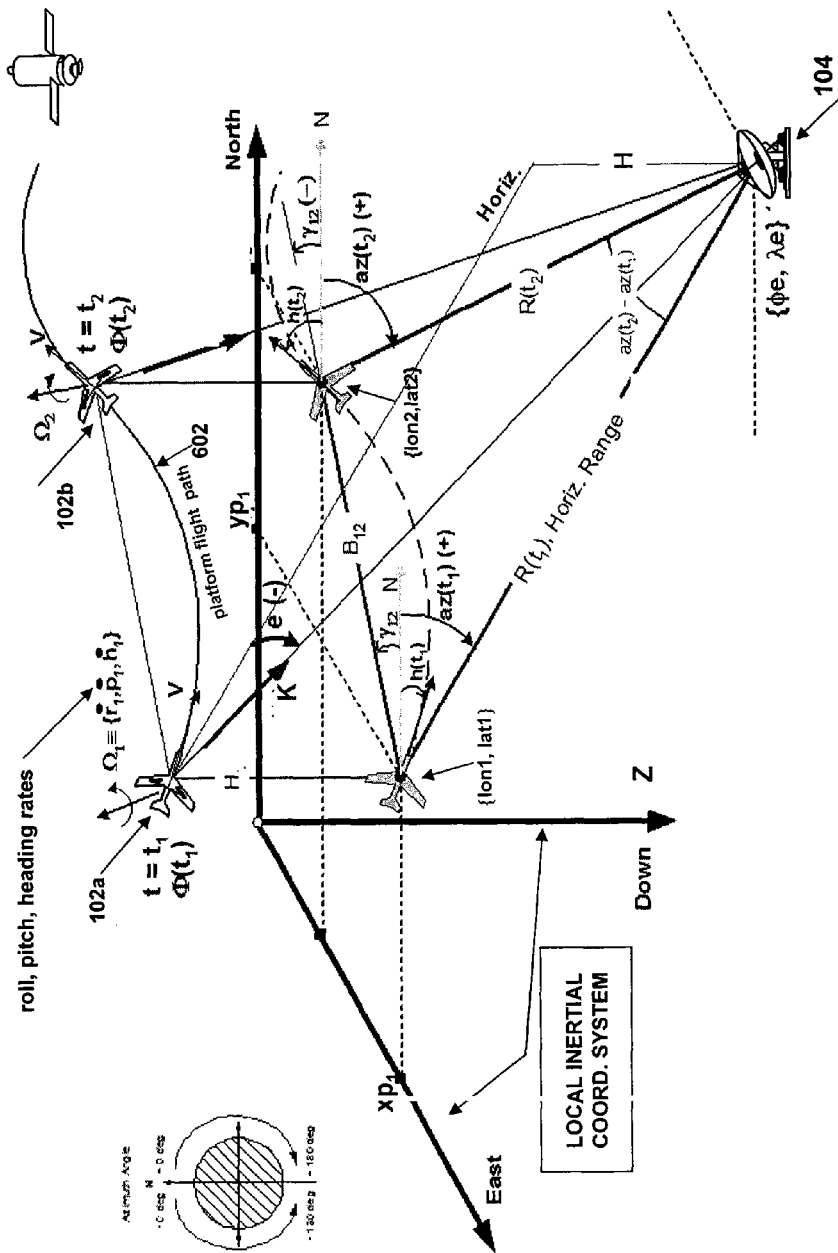
FIG. 6a is a view of possible rotational attitude changes of a platform during the time interval between phase measurements leading to PROC determination, according to an embodiment of the present invention.

Dealing with triangulations, Eq. 1.1 contains terms due to platform translation, $\Delta\Phi_T \propto \sin(az_{t+\Delta t}-az_t)$, because rotational changes, $\Delta\Phi_R \propto \Delta h, \Delta r, \Delta p$, may not contribute to the linear baseline B($\Delta t$) of the intervening horizontal plane triangle of FIG. 6a. Hence, $\Delta\Phi_R$ may be taken out of the measured phase-change given by Eq. 2.2. This can be done by simply using the navigation data on {roll, pitch, heading} and their associated rates provided with good accuracy by the GPS-aided Inertial Navigation System (INS) of the platform (see FIG. 6a in conjunction with FIG. 1a). In general, FIG. 6a shows the attitude of platform 102 with respect to emitter 104 as it traverses the flight path 602.

Next, the Triangulation Equation (1.1) may be written in terms of PROC equations, but without the approximations leading to Equations (1.6a and 1.6b). To simplify the description, we may restrict ourselves to a level-flight without roll (r=0), and pitch (p=0), and consider only rotational heading changes $\Delta h=(h_{t+\Delta t}-h_t)\neq 0$. The general case where, $\Delta r\neq 0$, $\Delta p\neq 0$, $\Delta h\neq 0$, involves equations that are longer, but the procedure is similar because all rotational attitude corrections stem from equations obtained by using Euler angle transformations between the local inertial coordinate system and the platform reference frame.

The electrical phase difference at an LBI (see the embodiment shown in the FIG. 4a), is given by the projection of the radiation wave vector onto the vector-arm of the LBI. That is, by the scalar product $\Phi=(Kp \cdot d_{LBI})$, with components of both vectors given in the same reference frame, the platform coordinate system: {Xp=tail-to-nose, Yp=left-to-right wing, Zp=up-to-down}. FIG. 4a shows the components of a generic LBI vector-arm on the platform coordinate system, i.e., $$d_{LBI}=d_{LBI}\{\sin(\delta),-\cos(\delta),0\}, \quad \text{(Eq. 6.1)}$$

where $\delta<0$ in Quadrant I, and $\delta>0$ in Quadrant II.

The wave vector in the platform frame, Kp, is obtained by sequential Euler angle rotations applied to the wave vector K in the local inertial reference frame, $$K=(2\pi/\lambda)\{\cos(el)\cos(az), \cos(el)\sin(az), -\sin(el)\}, \quad \text{(Eq. 6.2)}$$

That is, Kp=[Rx(r) ⊗ Ry(p) ⊗ Rz(h)] ⊗ K, where the symbols, ⊗, stands for matrix products, and Rz(h), Ry(p), Rx(r) are matrices representing heading, pitch, roll sequential rotations along the Zp, Yp, Xp axes. To shorten the description, we consider p=r=constant=0, and h=h(t)≠0, thus, Rx(0)=Ry (0)=identity matrix, while the matrix Rz(h), below, is represented by a heading rotation along the Zp axis, \

| cos(h) | sin(h) | 0 |
| -sin(h) | cos(h) | 0 |
| 0 | 0 | 1 |

The resultant components of the radiation wave vector in the platform frame $\{Xp, Yp, Zp\}$, are given by ($p=r=0$, $h=h(t)\neq 0$, case):

$$Kp=[Rz(h)\otimes K]=(2\pi/\lambda)\{\cos(el)\cos(az-h), \cos(el)\sin(az-h), -\sin(el)\} \quad \text{(Eq. 6.3)}$$

The scalar product $\Phi=(Kp\cdot d_{LBI})$, is given by the relation below (see also 1.3), $$\Phi=-(2\pi d_{LBI}/\lambda)\cos(el)\sin(az-h-\delta), (r=p=0, h\neq 0) \quad \text{(Eq. 6.4)}$$

Next, Equation (6.4) is used to calculate an equation for the total phase-change occurring during the measurement interval, $\Delta t=(t_2-t_1)=[(t+\frac{1}{2}\Delta t)-(t-\frac{1}{2}\Delta t)]$. The goal is to disentangle the contributions to the overall phase-change due to the platform rotational heading-changes, from the contributions due to translational motion. Since the elevation angle, el, may not change significantly during a reasonable interval $\Delta t=(t_2-t_1)$, one can take $el_{t1}\approx el_{t2}\approx el_t$ evaluated at a mean value, $t=\frac{1}{2}(t_2+t_1)=\frac{1}{2}[(t+\frac{1}{2}\Delta t)+(t-\frac{1}{2}\Delta t)]$; and write the overall phase-change as, $$\Delta\Phi=(\Phi(t_2)-\Phi(t_1))=-(2\pi d_{LBI}/\lambda)\cos(el_t)[\sin(az_2-h_2-\delta)-\sin(az_1-h_1-\delta)], \quad \text{(Eq. 6.5a)}$$

Where, $az_i=az(t_i)$, and $h_i=h(t_i)$.

For small $\Delta t$'s, the terms within the square brackets can be expressed in terms of a time-derivative, and Equation 6.5a reduces (1$^{st}$. order Taylor expansion) to Equation 1.4. A trigonometric relation such as, $[\sin(A)-\sin(B)]=2\sin\frac{1}{2}(A-B)\cos\frac{1}{2}(A+B)$, and $\sin(A-B)=\sin(A)\cos(B)-\cos(A)\sin(B)$, may also be used to write the equation (6.5a) as:

$$\Delta\Phi=[\Delta\Phi_T+\Delta\Phi_R]=-(2\pi d_{LBI}/\lambda)\cos(el)2\{\sin\frac{1}{2}(az_2-az_1)\cos\frac{1}{2}(h_2-h_1)-\cos\frac{1}{2}(az_2-az_1)\sin\frac{1}{2}(h_2-h_1)\}\times\cos[\frac{1}{2}(az_2+az_1)-\frac{1}{2}(h_2+h_1)-\delta] \quad \text{(Eq. 6.5b)}$$

For small angles, e.g., $\epsilon\ll 1$ rad ($\sim 57.3°$), $\sin(\epsilon)\approx\epsilon-(\frac{1}{3}!)\epsilon^3+\ldots$, and $\cos(\epsilon)\approx 1-(\frac{1}{2}!)\epsilon^2+\ldots$, the first-term within the curly brackets of Eq. 6.5b, is of $2^{nd}$ order in $\Delta h/2$, while the second-term is of $2^{nd}$. order in $\Delta az/2$. Thus, for angle excursions at rates $(\Delta\alpha/\Delta t)\sim(V/R)\sin(\alpha)\times(180/\pi)\sim 0.12°/\text{sec.}$, where $V=0.232$ Km/s, $R=100$ Km, $\alpha=60°$, the $1^{st}$ term of (Equation 6.5b) is associated with the platform translational motion, $\propto\sin\frac{1}{2}(az_2-az_1)$, while the $2^{nd}$ term stems from the platform rotational heading changes, $\propto\sin\frac{1}{2}(h_2-h_1)$, during the measurement interval $\Delta t=(t_2-t_1)$. That is, $$\Delta\Phi R_t=[(2\pi d_{LBI}/\lambda)\cos(el_t)2\cos\frac{1}{2}(az_2-az_1)\sin\frac{1}{2}(h_2-h_1)\cos(az_t-h_t-\delta)] \quad \text{(Eq. 6.6)}$$

Note that the rotational contribution, $\Delta\Phi_R$, can be calculated via NAV data, while the elevation and azimuth angles are obtained via our SBI embodiment as it was shown in Eqs (3.1), (3.2), and FIGS. 3a-3c. Typically, for reasonable $\Delta t$'s, $(\Delta az/\Delta t)$ 0.1 deg/s, and the factor $\cos\frac{1}{2}(az_2-az_1)\approx 1$, (e.g., even for $\Delta t\leq 20$ sec, $\frac{1}{2}\Delta az<1°$).

As mentioned above, in general, platform heading changes do not contribute to the horizontal triangle baseline side (see Eq. 1.1 and FIG. 6a), and should be left out of the total phase-change $\Delta\Phi_t$ before including it into the Triangulation-Equation written in terms of PROC. After the rotational correction, the remainder of Equation 6.5b should be equal to the phase-difference due primarily to the platform translational motion. Explicitly, $$\Delta\Phi T=(\Delta\Phi_t-\Delta\Phi_R)=[(m\Delta\Phi_t+2\pi\Delta n_t)-\Delta\Phi R]=-[(2\pi d_{LBI}/\lambda)\cos(el_t)2\cos\frac{1}{2}(h_2-h_1)\sin\frac{1}{2}(az_2-az_1)\cos(az_t-h_t-\delta)] \quad \text{(Eq. 6.7)}$$

where the overall phase differential, $(m\Delta\Phi_t+2\pi\Delta n_t)$, stands for, $$\Delta\Phi_t=\{[m\Phi(t+\frac{1}{2}\Delta t)-m\Phi(t-\frac{1}{2}\Delta t)]+2\pi[n(t+\frac{1}{2}\Delta t)-n(t-\frac{1}{2}\Delta t)]\}.$$

The original triangulation Eq. 1.1, $R(t)=[B_{12}\sin(az(t+\Delta t)-\gamma)/\sin(az(t+\Delta t)-az(t))]$, requires $\sin(\Delta az)$, which can be obtained from Eq. 6.7, by making use of the relation, $2\sin\frac{1}{2}(az_2-az_1)=[\sin(az_2-az_1)/\cos\frac{1}{2}(az_2-az_1)]$, to get $\sin(az_2-az_1)$. Finally the original triangulation Eq. 1.1 can be re-written in terms of the measured phase-change corrected by the platform attitude-change. For symmetry and accuracy reasons, it is convenient to consider the mean-value $<R(t)>$ of the slowly varying range R in the measuring interval $\Delta t=(t_2-t_1)$, that is at, $t=\frac{1}{2}(t_2+t_1)=\frac{1}{2}[(t+\frac{1}{2}\Delta t)+(t-\frac{1}{2}\Delta t)]$. The Taylor series expansion of the sides of the triangle, $R(t-\frac{1}{2}\Delta t)$, and $R(t+\frac{1}{2}\Delta t)\}$ allow a comparison between the mean $<R(t)>\approx\frac{1}{2}[R(t+\frac{1}{2}\Delta t)+R(t-\frac{1}{2}\Delta t)]$ and $R(t=\frac{1}{2}(t_1+t_2))$. That is, $R(t\pm\frac{1}{2}\Delta t)=R(t)\pm(dR/dt)(\frac{1}{2}\Delta t)+\frac{1}{2}(dR/dt)^2(\frac{1}{2}\Delta t)^2\pm$. From the equation (1.1), and the above trigonometric relation, we can write:

$$\langle R(t)\rangle = \frac{1}{2}\left[R\left(t+\frac{1}{2}\Delta t\right)+R\left(t-\frac{1}{2}\Delta t\right)\right] = R(t) + \quad \text{(Eq. 6.8)}$$

$$2^{nd} \text{ order terms.}$$

$$= [B_{12}\sin(az_t-\gamma_{12})/\sin(az_2-az_1)]\cos\frac{1}{2}(az_2-az_1).$$

The departure of mean $<R(t)>$ from $R(t)$ is given by the $2^{nd}$ order derivative, i.e., $[<R(t)>-R(t)]/R(t)\approx\frac{1}{2}(V\Delta t/R)^2\sim 10^{-4}$, for $V=0.232$ Km/s, $R=100$ Km, $\Delta t=10$ s. Hence, an approximation $<R(t)>=R(t)$, and:

$$R(t)=-(2\pi d_{LBI}/\lambda)\cos(el_t)\cos\frac{1}{2}(h_2-h_1)\times[B_{12}\sin(az_t-\gamma_{12})/(\Delta\Phi_t-\Delta\Phi R_t)]\times\cos[az_t-\frac{1}{2}(h_2+h_1)-\delta] \quad \text{(Eq. 6.9a)}$$

Note that if $h_2=h_1=h$, $(\Delta\Phi_R=0)$, Equation 6.9a reduces to the approximation Equation 1.6. Recall also that $\Delta\Phi_t=(m\Delta\Phi_t+2\pi\Delta n_t)$, while $\Delta\Phi_R$, is explicitly given by Eq. 6.6. Equation 6.6 for $\Delta\Phi R_t$ can be calculated by using the NAV data on $h_2$, $h_1$, while $\cos(el_t)$ and $az_t$ can be obtained by means of the SBI-LBI embodiment described in the FIGS. 2a, 3a. It is noted that for $\Delta t$'s$\leq 20$ s, $\cos\frac{1}{2}(az_2-az_1)\approx 1$.

Below, the Eq. 6.9b explicitly shows the possible range ambiguities associated with PROC.

$$R_t=-(2\pi d_{LBI}/\lambda)\cos(el_t)\cos\frac{1}{2}(h_2-h_1)\times\{B_{12}\sin(az_t-\gamma_{12})/[m\Delta\Phi_t+2\pi\Delta n_t)-\Phi R_t]\}\cos[az_t-\frac{1}{2}(h_2+h_1)-\delta], \quad \text{(Eq. 6.9b)}$$

The size of triangle baseline $B_{12}$ and its orientation $\gamma_{12}$ are obtained via the platform INS/GPS "platform-fixes" at phase measurement times $t_1=(t-\frac{1}{2}\Delta t)$, and $t_2=(t+\frac{1}{2}\Delta t)$, with $t=\frac{1}{2}[(t+\frac{1}{2}\Delta t)+(t-1/2\Delta t)]$.

Figure 6B:
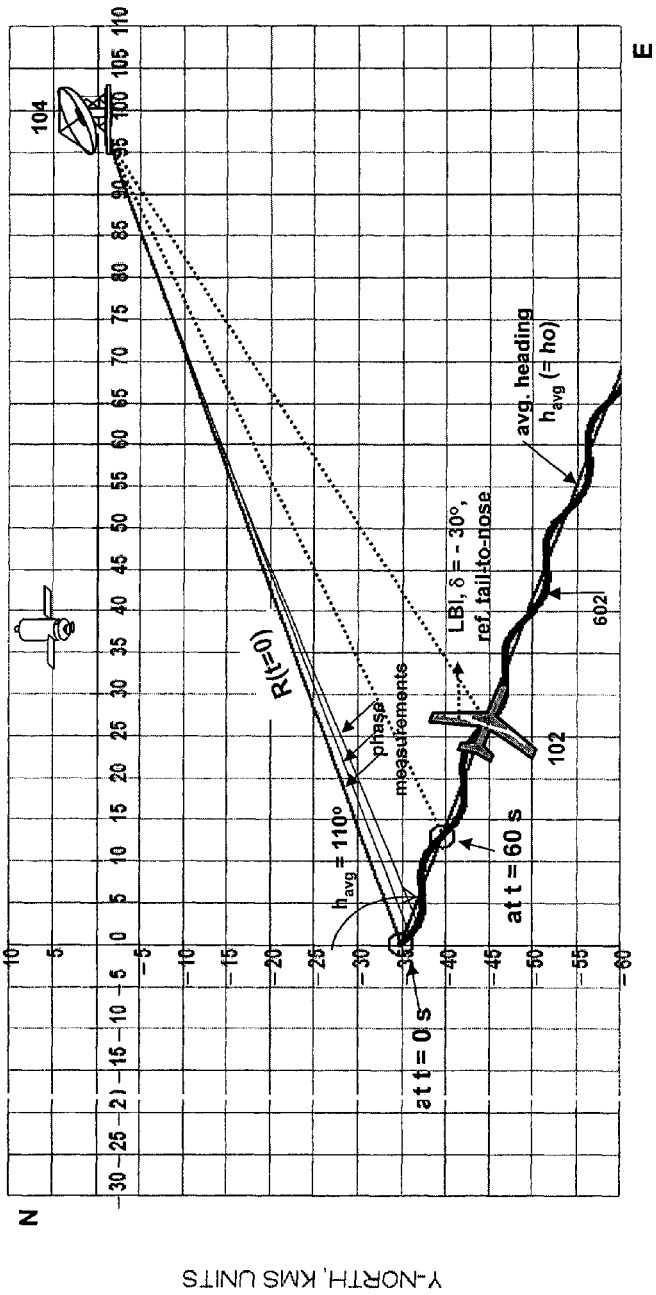
FIG. 6b is a view of a flight-path example including heading attitude oscillations of a platform when making PROC determinations, according to an embodiment of the present invention.

Dealing with the PROC triangulation equation 6.9b, we have developed and made use of a math-model providing time-dependent numerical results which include correction for platform rotational attitude changes between measurement times. Below, a few examples obtained at different times during the platform flight, ref. FIG. 6b (e.g., at $t=30$ s, $t=60$ s, and $t=80$ s), may be depicted to further illustrate the process. Ambiguity resolution is carried out by the method described in FIGS. 2c and 2d. The model includes sinusoidal oscillations added to the platform constant drift vector $V_{avg}=V_0[\sin(h_0)E+\cos(h_0)N]$. That is, the velocity vector contains an oscillatory contribution, i.e., $V=V_{avg}+Av\cos(\omega xt)[\cos(h_0)E-\sin(h_0)N]$, where the period of the oscillation $Th\approx 60$ sec, and $\omega=(2\pi/Th)$. For simplicity, we have assumed that the oscillatory component of V is orthogonal to the drift component $V_{avg}$.

Integration of V(t), plus initial conditions readily provides the platform location vector $\{xp(t), yp(t)\}$ versus time, i.e., $r(t)=r(0)+V_{avg} \times t+(Av/\omega) \sin(\omega x t) [\cos(ho) E - \sin(ho) N]$, where $(Av/\omega)=\Pi$ stands for the maximum amplitude of the platform sinusoidal trajectory (e.g., $\Pi \approx 1$ Km).

FIG. 6b shows the flight-path and a set of input parameter values considered during the simulation of Eq. 6.9b. Note that platform 102 undergoes oscillatory attitude changes as it traverses its flight path 602. The heading oscillations leads to spurious contributions to the PROC determination of the incoming RF signal, and therefore compensation may be needed for PROC triangulation purposes.

Around each of the selected time (t=30, 60, 80 s), mod-$2\pi$ phase measurements are made to determine the phase-change that ensues at each of the centered times t. Recall that the phase $\Phi$ and the measured mod-$2\pi$ phase m$\Phi$ are related as, $\Phi(t)=[m\Phi(t)+(2\pi)\text{trunc}(\Phi(t)/2\pi)]=[m\Phi(t)+(2\pi)n(t)]$. The model deals with the reduced phase-differential m$\Delta\Phi_t$ and the unknown phase-cycle-"jump" $\Delta n_t$ at $t=\frac{1}{2}(t_1+t_2)$, via the explicit forms, Eqs. 2.1, 2.2, i.e., $m\Delta\Phi_t=[m\Phi(t+\frac{1}{2}\Delta t)-m\Phi(t-\frac{1}{2}\Delta t)]$, $\Delta n_t=[n(t+\frac{1}{2}\Delta t)-n(t-\frac{1}{2}\Delta t)]$; with the total phase-change written as, $\Delta\Phi_t=[m\Delta\Phi_t+2\pi\Delta n_t]$ Dependence on the time-interval $\Delta t$ is not shown, but implicitly understood in the left-hand-side members of the above set of relations. Equation 6.9b includes the undetermined phase-cycle-jump, $\Delta n_t$, which in the presence of rotational platform attitudes could be a large integer number even at small time-intervals $\Delta t$'s between phase measurements. In these cases, most of the contribution to $\Delta n_t$ comes from heading attitude changes, $\Delta h$, rather than from translational azimuth changes $\Delta az$. Since $\Delta\Phi_t$ given Eq. 6.6 can be readily calculated, it may prove convenient to introduce the quantity:

$$\Delta nR_t = \text{trunc}(\Delta\Phi R_t/2\pi) \quad \text{(Eq. 6.10a)}$$

and to consider possible $\Delta_t$ values relative to the well-determined $\Delta nR_t$ value, i.e., $$\Delta n_t = \Delta nR_t + \delta n_t \quad \text{(Eq. 6.10b)}$$

The new undetermined variable, $\delta n_t$, saves computation time because in general, it may be a small integer number compared with $\Delta n_t$. This can be seen from our mathematical model with a set of parameters briefly described in FIG. 6c. For example, examine Table 1 below, especially those values obtained with phase measurements near t=30 s, 60 s, and 80 s.

TABLE 1

| | t = 0 | 10 | 20 | 30 | 40 | 50 | 60 | 70 | 80 |
|---|---|---|---|---|---|---|---|---|---|
| | | | | $\Delta t = 2$ | | | | | |
| $\Delta n(t, \Delta t) =$ | 1 | −13 | −14 | 0 | 16 | 14 | 1 | −13 | −15 |
| $\Delta nR(t, \Delta t) =$ | 0 | −14 | −15 | 0 | 15 | 13 | 0 | −13 | −15 |
| $\delta n(t, \Delta t) =$ | 1 | 1 | 1 | 0 | 0 | 1 | 1 | 0 | 0 |
| | | | | $\Delta t = 5$ | | | | | |
| $\Delta n(t, \Delta t) =$ | 1 | −34 | −36 | 1 | 39 | 37 | 2 | −32 | −36 |
| $\Delta nR(t, \Delta t) =$ | 0 | −35 | −38 | 0 | 38 | 34 | 0 | −33 | −38 |
| $\delta n(t, \Delta t) =$ | 1 | 1 | 2 | 1 | 1 | 3 | 2 | 1 | 2 |

Note that $\Delta nR_t=0$, both at t=30 s, and t=60 s. This is because the platform heading oscillates with a period Th=60 s. FIG. 6b shows, that in the vicinity of both t=30 s and t=60 s, the amplitude of the heading oscillations is very small, $\Delta nR_t \sim 0$, and hence, $\Delta n_t$ takes on a small integer value due only to the platform translation ($\Delta az$) during $\Delta t$. After substituting, $\Delta n_t = (\Delta nR_t + \delta n_t)$, into Equation 6.9b, the PROC triangulation equation adopts the form below, $$R_t = -(2\pi d_{LBI}/\lambda) \cos(el_t) \cos \frac{1}{2}(h_2-h_1) \times \{B_{12} \sin(az_t - \gamma_{12})/[(m\Delta\Phi_t+2\pi(\Delta nR_t+\delta n_t))-\Delta\Phi R_t]\} \times \cos [az_t - \frac{1}{2}(h_2+h_1)-\delta] \quad \text{(Eq. 6.11)}$$

Note that the computation of $\Delta R_t = \text{trunc}(\Delta\Phi R_t/2\pi)$ allows for a first estimate of the phase-cycle-jump $\Delta n_t$. Ordinarily the integer variable $\delta n_t$ stands for small departures around the integer value $\Delta nR_t$ because the platform attitude rotations, if any, generally constitute the primary contribution to the overall phase-change $\Delta n_t$.

Figure 6C:
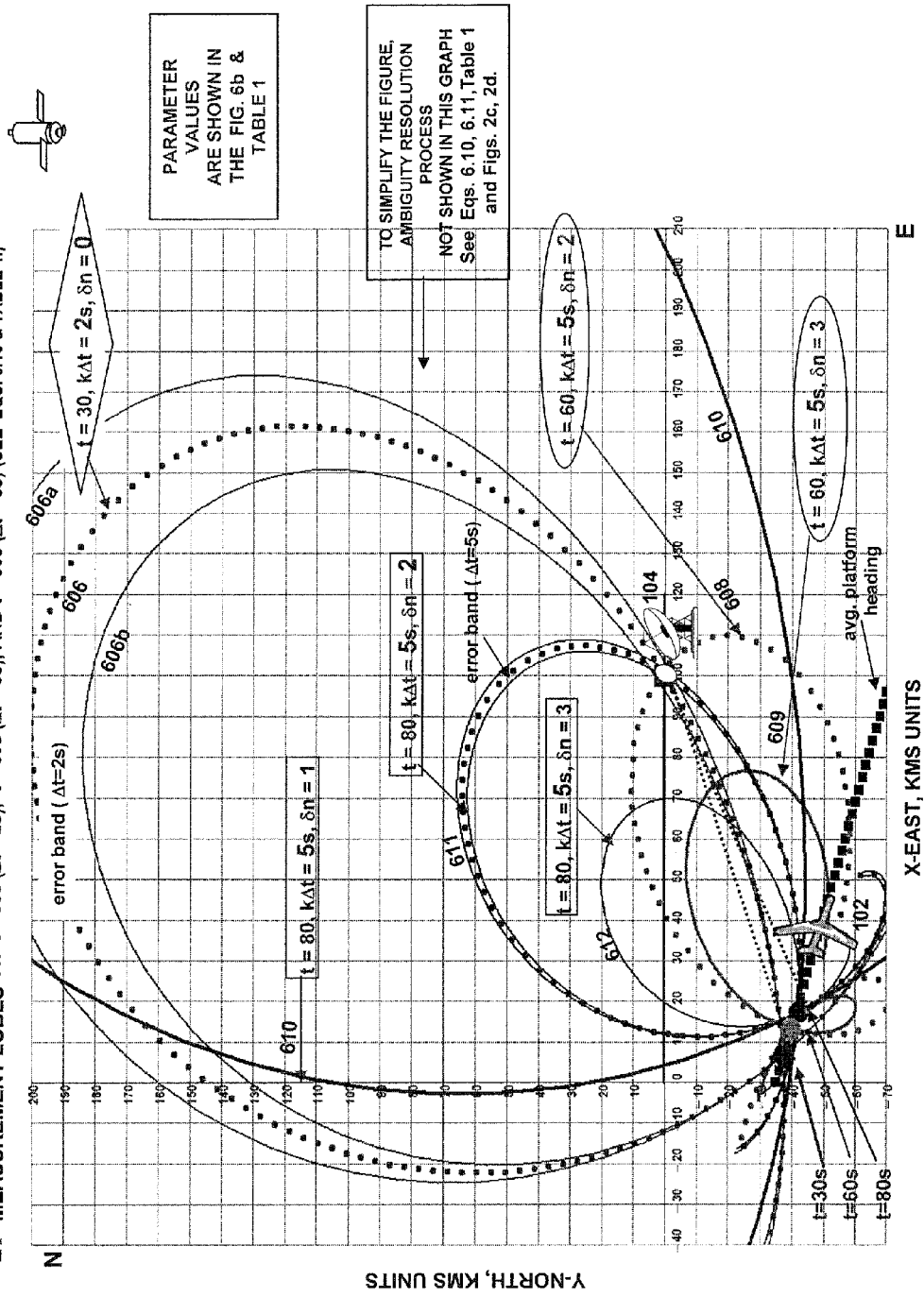
FIG. 6c shows the emitter location by intersection of PROC lobes (platform attitude contributions corrected) associated with measurements at three different times during the platform flight (ref.

The range-lobes shown in the FIG. 6c., in conjunction with parameter values listed in the FIG. 6b show our model results of the procedure described above with examples of $\Delta\Phi$ determinations at three different times t=0, t=60 s, and t=80 s. To simplify the figure, only a pair of ambiguities associated with measurements at t=60 s and t=80 s, are depicted in this graph.

Once the contribution $\Delta\Phi R_t$, from rotation changes is subtracted out, (see Equations. 6.6 to 6.11), the $\delta n$-ambiguity resolution process can be performed as described in the FIGS. 2c, 2d. That is, at each PROC determination time, t=0 s, t=60 s and t=80 s, we use two measurement intervals: a short, interval (t, t+$\Delta t$) providing unambiguous results, and a longer time interval (t, t+k$\Delta t$), (k>1), with ambiguous results, but providing a good range accuracy. In our discussion of the FIGS. 2c, 2d, it was established that the range-lobe from the long time interval which is closest to the short time range-lobe will be, most likely, the correct one.

The range lobes 606 (FIG. 6c) were obtained via LBI phase measurements performed a t=30 s, t=31 s, and t=32 s., while the platform is flying along the path 602 (FIG. 6b). Similarly, the range lobes 608 and 609 are associated with phase measurements at t=60 s, t=61 s and t=65 s. The lobes 610, 611, and 612 stem from phase measurements at t=80 s, t=81 s, and t=85 s.

Next, consider that the statistical accuracy of an emitter location can be further improved by a weighted combination of sequential locations obtained during the flight of the platform. Equation 1.7 shows that the range-error of a particular location, depends on the phase measurement error, $\sigma\Delta\Phi$, the baseline spread, B~V$\Delta t$, the platform-to-emitter range, $R_t$, and on the AOA through the terms $\sin(az_t-h_t)$, $\cos(az_t-h_t-\delta)$. The cross-range error is simply given by $\sigma c R_t = R_t \sigma\alpha$, where $\sigma\alpha$ represents the stdv of the SBI-measured AOA, e.g., $\sigma\alpha \sim (\lambda/2\pi d_{SBI}) [\sigma\Phi/\cos(el) \cos(\alpha-\delta)]$.

Dealing with a single, particular geo-location of the emitter, once the AOA and PROC measurements including ambiguity resolution are performed, the coordinates of the emitter in the local inertial system, $\{N(\equiv Y), E(\equiv X), D(\equiv Z)\}$, are given by the horizontal components $\{X(t), Y(t)\}$ in the Flat-Earth-Approx., (see FIG. 6a). That is, $$X(t) = xp(t) + R(t) \sin az(t), \text{ and } Y(t) = yp(t) + R(t) \cos az(t) \quad \text{(Eq. 7.1)}$$

The GPS/INS platform position "fixes" are denoted by $\{xp(t), yp(t)\}$, while $R(t)$ stands for the platform-to-emitter PROC-determined range via Eq. 6.9b, or 6.11. The above equations, deal with a "single-cut" PROC-triangulation of the emitter at time t, and a theoretical model for the error of the location can be derived by differentiation. Assuming Gaussian statistics, after an rms average, we get an equation for the variances of the generic unfiltered location at some time t (only the dominant terms are shown here), $$\sigma X(t)^2 = [\sigma R(t)^2 \sin az(t)^2 + (R(t)\sigma\alpha)^2 \cos az(t)^2]$$

$$\sigma Y(t)^2 = [\sigma R(t)^2 \cos az(t)^2 + (R(t)\sigma\alpha)^2 \sin az(t)^2]$$

$$\sigma XY(t) = [\sigma R(t)^2 - (R(t)\sigma\alpha)^2]^{1/2} \sin az(t) \times \cos az(t), \quad \text{(Eq. 7.2)}$$

where $$(\sigma R_t/R_t)^2 \approx [\lambda/2\pi d_{LBI} \cos(el)]^2 [R_t \sigma\Delta\Phi/V\Delta t \sin(\alpha_t) \cos(\alpha_t-\delta)]^2 + [\sigma\alpha \cos(2\alpha_t-\delta)/\sin(\alpha_t) \cos(\alpha_t-\delta)]^2 + \ldots \quad \text{(Eq. 7.3)}$$

Equation 7.3 includes $\sigma\Delta\Phi$ which is the stdv of the $\Delta$-phase error, and $\sigma\alpha$ which stands for the stdv associated with the SBI-measured AOA. Small error contributions such as, ($\sigma d/d_{LBI}$), due to LBI-arm error, ($\sigma B/B$) due INS/GPS baseline error associated with the platform position fixes, all, heading error, and $\sigma\delta$, due to LBI installation orientation error are not taken into account here. At variance with the Equation 1.7, the second term in Equation 7.3 is due to the fact that the measured AOA (with stdv $\sigma\alpha$) now allows the selection of the portion of the range-lobe where the emitter should be located.

The corresponding equation of the error-ellipse centered at the measured location Eq. 7.1 is defined by $$AX(X-X(t))^2 + AY(Y-Y(t))^2 - 2AXY(X-X(t))(Y-Y(t)) = (\kappa)^2, \quad \text{(Eq 7.4)},$$

where $\kappa = [-2 \times \ln(1-\text{Prob})]^{1/2}$.

For example $\kappa \approx 2.45$ corresponds to an ellipse containing (Prob=95% of the errors. The coefficients AX, AY, AXY of the error ellipse 7.4 are related to the variances 7.2 and 7.3 associated with the measured location 7.1, i.e., $$AX(t) = \sigma Y(t)^2 / [\sigma X(t)^2 \sigma Y(t)^2 - \sigma XY(t)^2],$$

$$AY(t) = \sigma X(t)^2 / [\sigma X(t)^2 \sigma Y(t)^2 - \sigma XY(t)^2],$$

$$AXY(t) = \sigma XY(t) / [\sigma X(t)^2 \sigma Y(t)^2 - \sigma XY(t)^2] \quad \text{(Eq 7.5)}$$

Figure 7A:
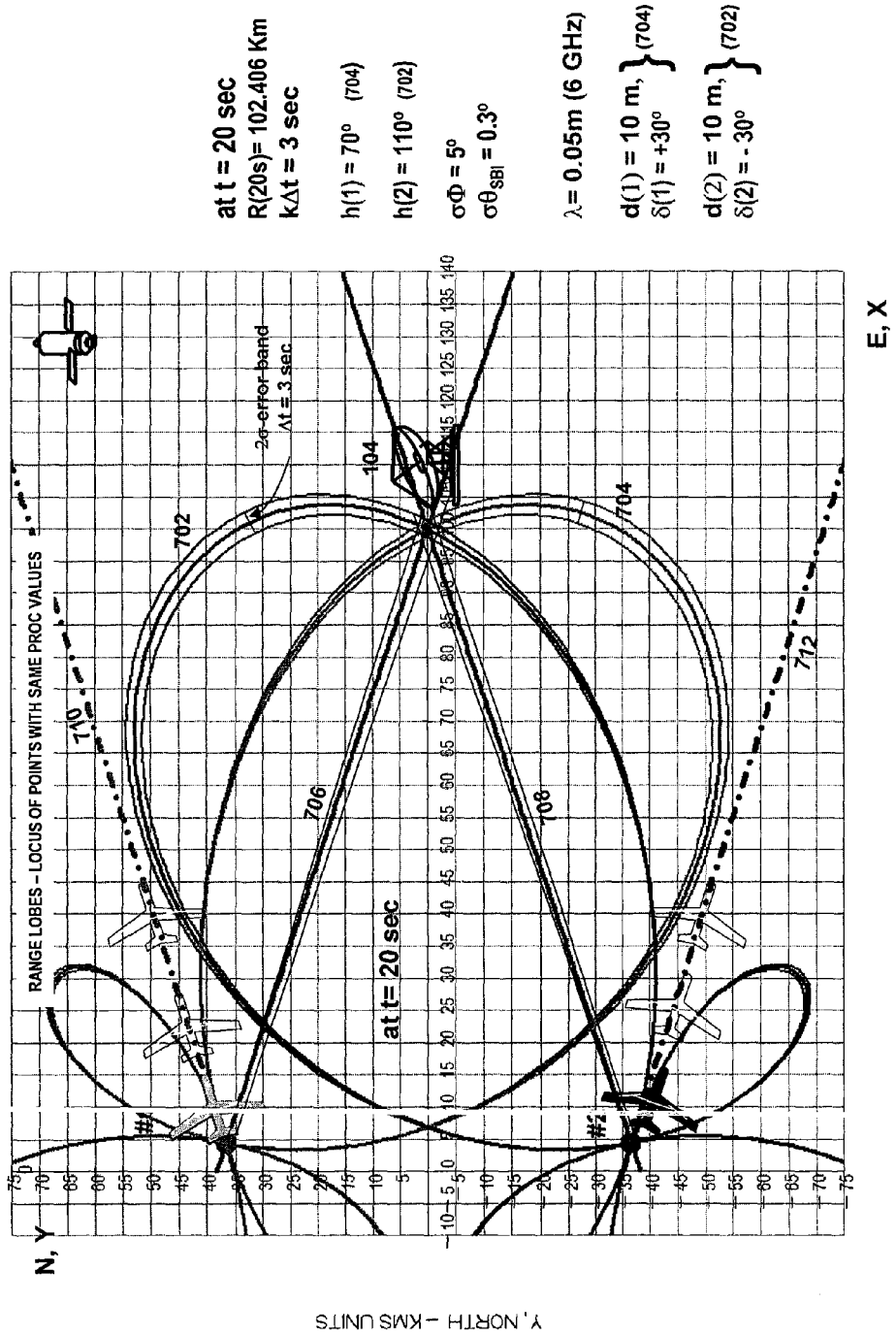
FIG. 7a is a view of two platforms performing sequential, coordinated PROC+AOA measurements, according to an embodiment of the present invention.

As an example of a weighted statistical average of several PROC+AOA determined locations of an emitter, consider the case schematically depicted in the FIG. 7a. In general, the intersection points of two or more PROC lobes 702 and 704 may be used to estimate the geo-location of emitter 104. The AOA measurements (706 and 708), however, may also be used in conjunction (i.e. the intersection of all four measurements) with PROC curves 702 and 704 to further increase the accuracy of the geo-location estimation.

In this case, two data-linked platforms are performing a time-series of synchronized independent measurements leading to a series of locations of the same emitter by each aircraft. In the computer math-model, the "measurements" are considered to be the theoretical values adopted by the evolving phase and AOA angles during the platform's flight, plus random Gaussian contributions with prescribed stdv widths, $\sigma\Phi$ and $\sigma\alpha$ respectively.

Figure 7B:
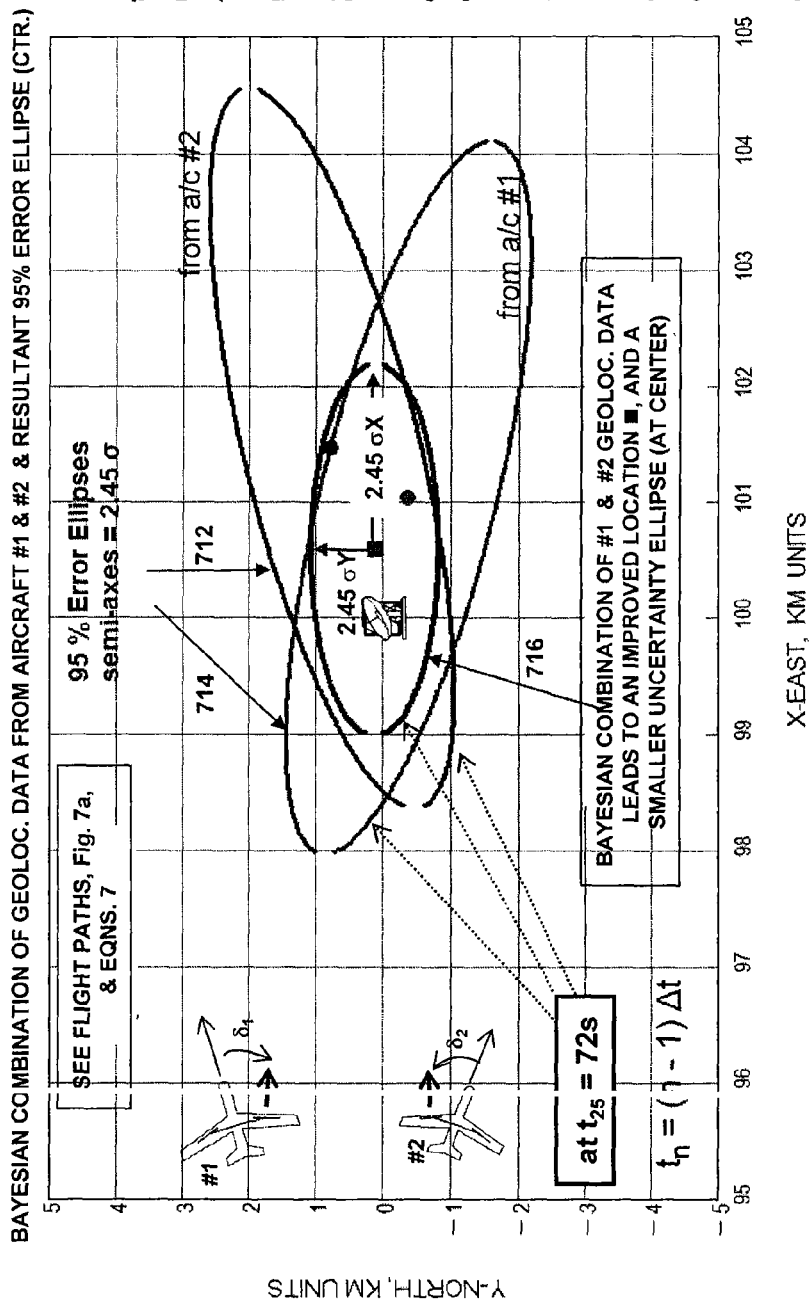
FIG. 7b is a view of the 95% error ellipses associated with the emitter location from independent measurements by platforms 1 and 2, and a Bayesian combination of the locations from platforms 1 and 2, according to an embodiment of the present invention.

Platforms #1 and #2 were assigned different random number generators seeds to assure independence. FIG. 7b shows the two 95% error ellipses associated with measurements by platforms #1 and #2 made at a particular time $t = t_{25} = 72$ s, with $k\Delta t = 3$ s. In general, the geo-location of emitter 104 is estimated as an area. This area of uncertainty is defined by error ellipses shown in FIGS. 7b and 7c (i.e. the smaller the ellipse, the more accurate the geo-location estimate). The average geo-location estimate is taken to be the center point of the error ellipse.

The large ellipses correspond to PROC determinations independently made by each aircraft, and were calculated by using the equations 7.1 to 7.5. Statistically, the information on these two error ellipses can be combined into a single location ellipse smaller than any of the two #1 and #2, (see FIG. 7b). Small error ellipse 716 (i.e. a more accurate estimate of the geo-location of 104) is produced when error ellipses 712 and 714 are combined (i.e. the PROC measurements of platforms #1 and #2 are combined).

The combination procedure that we use in this example is based on the assumption of Gaussian statistics and on an application of Baye's theorem. Note that in this case, because of the adopted platforms-to-emitter symmetrical geometry and kinematics, the resultant axes of the combination ellipse are parallel to the inertial system axes. It should be emphasized that these ellipses are statistically designed to contain 95% of the errors, and hence the magnitude the semi axes in units of the corresponding rms error is given by $\kappa = [-2 \ln(1-\text{Prob})]^{1/2} \sqrt{2.45}$ (×rms error, $\sigma$).

Figure 7C:
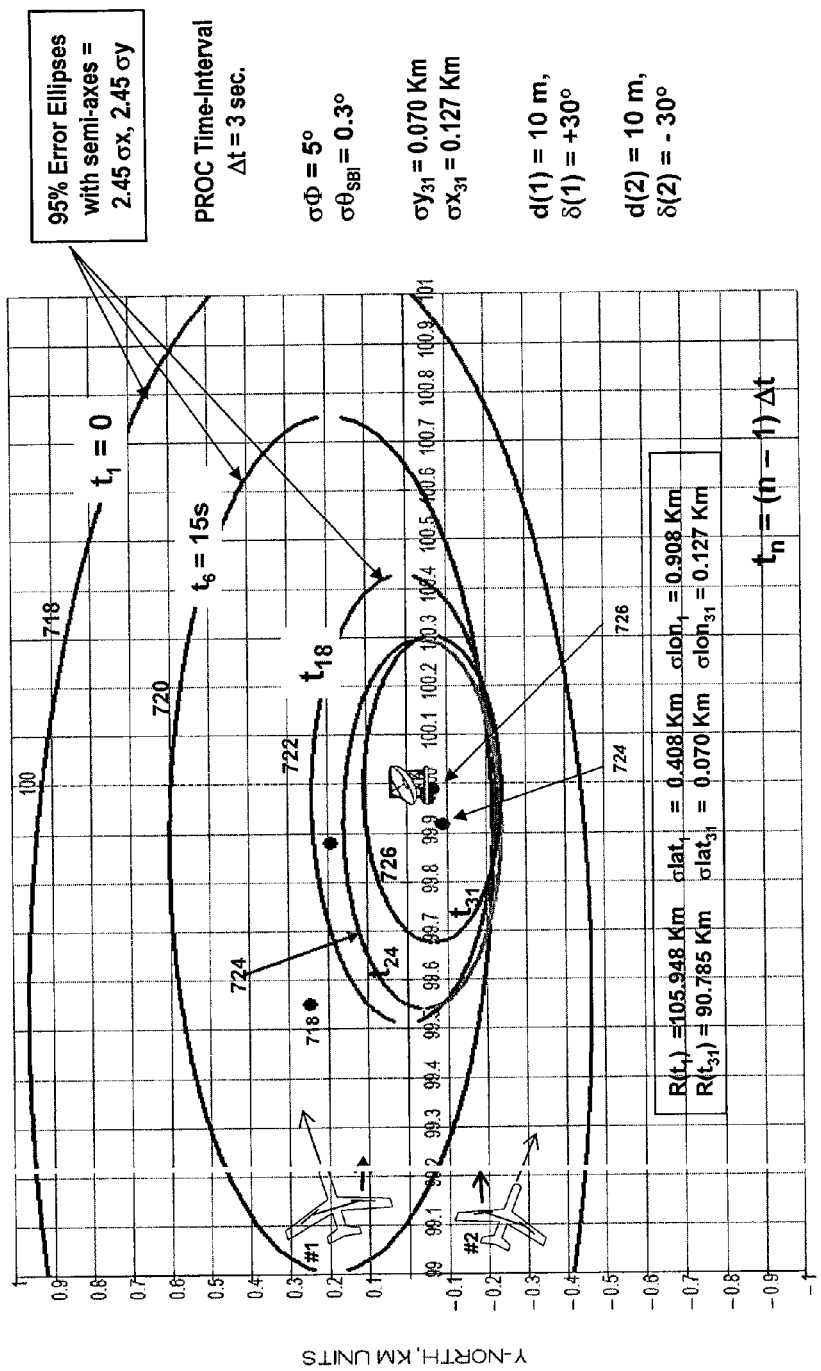
FIG. 7c is a view of the results of the step-by-step filtering of incoming location data, with the ensuing gradual improvement of the combined location and its associated uncertainty; according to an embodiment of the present invention.

A similar combination procedure is continuously applied during platforms flight as measurements are performed. The resultant combination ellipse obtained at every measurement time is statistically combined with the resultant combination ellipse from the previous measurement time. FIG. 7c shows a gradual improvement of the emitter error uncertainty and location as the number of independent measurements increases. Error ellipse shrinks in size from 718, to 720, to 722, to 724, to 726 as the number of measurements increase (i.e. more PROC lobes are combined).

Note that the centers of the error ellipses at times $t_{18}$ and $t_{31}$ almost coincide, and are very close to the true emitter's location. However, the resultant error ellipse at $t=t_{18}$ has a much larger area of uncertainty than the error ellipse at $t=t_{31}$. Note that this example makes it obvious that the statistics (Gaussian) gets specified not only by the average target location, but also by the standard deviation from the predicted average target location.

Figure 7D:
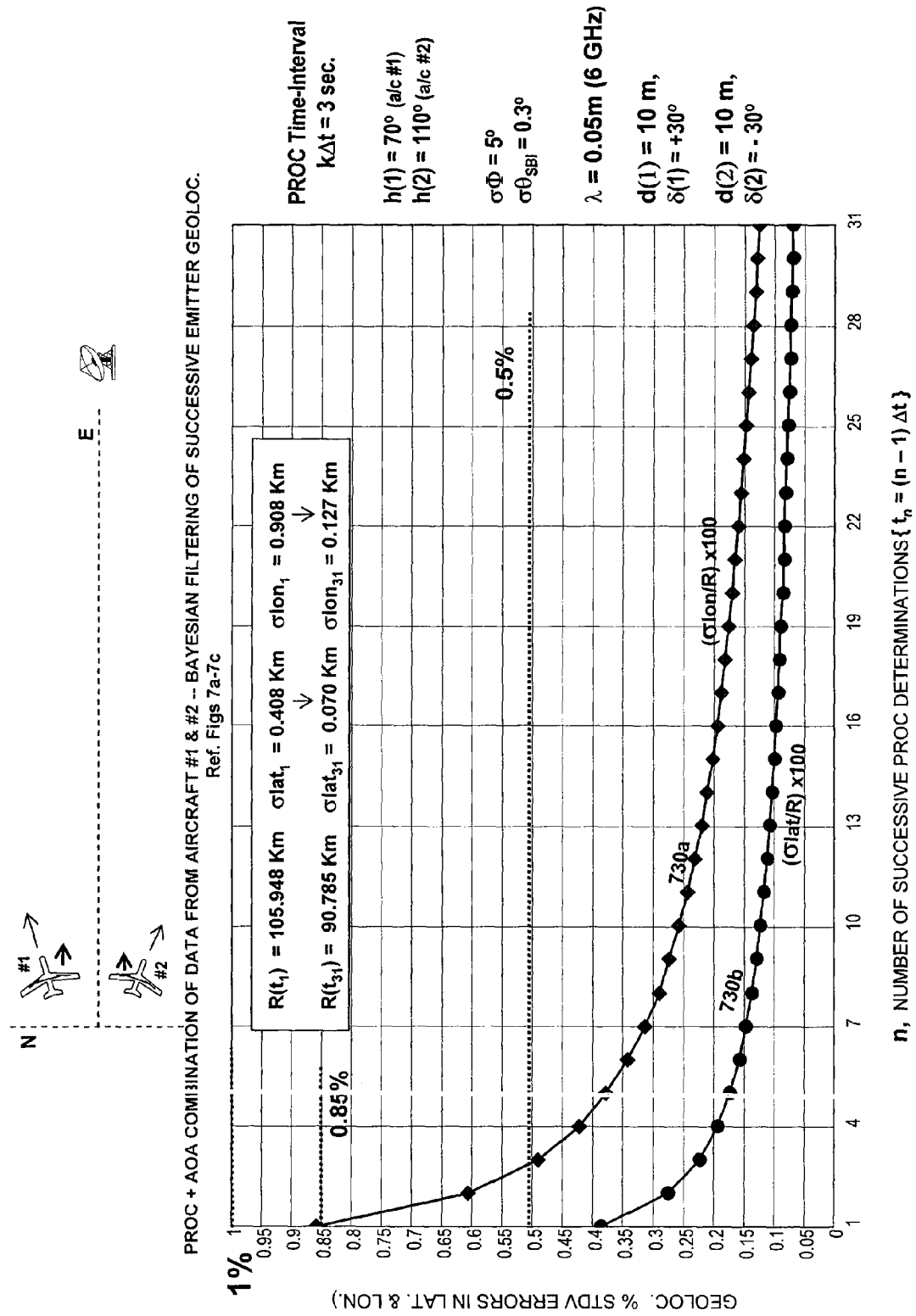
FIG. 7d is another view of the filtered location error by a combination of data from platforms 1 and 2 versus the number of PROC+AOA location determinations during the motion of platforms 1 and 2, according to an embodiment of the present invention.

FIG. 7d depicts the rms standard deviation percent (%)error of both the latitude and longitude of the emitter. That is, $[\sigma lat_n/R(t_n)] \times 100$, $[\sigma lon_n/R(t_n)] \times 100$, versus the number n of successive PROC measured locations of the emitter. Note that even at the onset of the process, a single determination (n=1, $t_1=0$) is sufficient to ensure $\sigma lon_1 \sim 0.85\%$, and $\sigma lat_1 \sim 0.4\%$. In general, as the number of PROC measurements are computed, the stdv errors 730 in estimating the geo-location of emitter 104 decreases exponentially, i.e., one PROC measurement is in the 0.85% range units, whereas three PROC measurements combined reduce the stdv error below the 0.50% range units.

A main objective of this invention is to provide an improved, and economical method for aircraft to passively locate uncooperative RF threat emitters. As described above, it is apparent that it may provide increased speed and accuracy for single airborne platforms to economically determine the location of the emitters. The analytical basis of the technique and our modeling and simulation work indicates that it may be relatively simple to implement, providing a quick and more accurate geo-location solution than other single aircraft geo-location methods. Simple hardware and software modification to the platform may be performed, and in many cases it may only require minimal increase in processing and no additional hardware. The system, should allow the platform to be able to begin locating the emitter from the moment the threat is detected, with subsequent received signals from the same emitter being used to continue refining the estimated geo-location of the threat. The technique can be readily extended from single to multiple data-linked platforms with additional improvement in both speed and accuracy of the emitter's geo-location. Several instances of the associated algorithm may run in parallel if the platform's receiver system is receiving and tracking multiple emitters. An emitter identification system may first separate the received radiation from identified emitters, and processes may run in parallel. The invention could also be applied to a similar geo-location system on a moving ground-based vehicle or watercraft, and it can be applied a broad range of radio frequencies.

The system for performing passive geo-locations by triangulations based on phase-rate-of-change (PROC) measurements may be mounted on a platform in relative motion with respect to an emitter whose location is to be determined. The system should include at least two RF antenna elements per unobstructed field of view, and a receiver which determines the frequency and relative phase of the radiation between the two apertures (LBI). The system/apparatus may also benefit from inputs from a GPS/INS system including an attitude sensor aboard the platform to inform the geo-location system of the platform's position, velocity, spatial attitude (heading, pitch and roll) and corresponding rates at the time the signal of interest is received. If the reports from the GPS/INS system does not coincide with the times of the received radiation, a processor may require interpolation between report times to the measurement times of the received signal. A processor may collect the information, including the time of each phase measurement, and subsequently calculate a value for the corresponding PROC and range-curves via Equations 6.9a-6.9c, while the corresponding uncertainty is given by Eqs. 1.7, or 7.3.

If angle-of-arrival (AOA) information is available (e.g., embodiment depicted in FIG. 3b) angles around the measured AOA direction, (az–h–δ)±a few σα's, may be considered in the calculation of the range-lobe. The AOA information can be applied immediately to the range curve to calculate an intersection which determines the location of the emitter via Equations. 7.1-7.5.

The various measurements time-intervals, Δt, kΔt (k>1) to be used can be preprogrammed by a mission data file to optimize performance, or the system can be programmed to be adaptive by monitoring the phase-rate-of-change for very short measurement time-intervals (see Equation. 2.4). All measurements within a maximum time interval may be saved while range curves are calculated for the smaller time intervals within the maximum kΔt. The rougher range curves associated with the smaller Δt are used to match-select the correct ambiguity of the more precise range-lobes associated with the maximum allowed time interval, (see FIGS. 2c, 2d).

If the AOA is undetermined, then intersections of range-lobes over time (e.g., FIG. 1c) may determine the location of the emitter. Since the range curves and possible AOA measurements may all be corrupted by environmental and receiver noise, the curves may not all intersect precisely at the true emitter location, but rather at multiple points nearby. The associated uncertainty can be estimated in a manner similar to the procedure used to obtain Equations. 7.1-7.3.

The processor may use a filter such as a Kalman Filter for a weighted combination of the measured data-flow, while using the estimated uncertainty to weight the various inputs. Once the target emitter location is determined within a set threshold of accuracy, the system may report the estimated emitter location and associated uncertainty to the user. The uncertainty can be reported as a single radius around the location (e.g., Circular Error Probability), or as an error ellipse, the size and orientation of the semi axes. Further refinements may be reported as more interceptions are gathered from the same emitter.

It is noted that although specific examples are described above, that various embodiments are possible. For example, the PROC measurements may be performed on a single platform having one or more interferometers, or multiple data linked platforms each having one or more interferometers. The data linked platforms may be vehicles (e.g. airplanes) that are able to share various types of data (e.g. PROC measurements, Location information, etc.).

It is also noted that the system hardware may be implemented in various embodiments. For example, the system processor may be a programmable micro-processor, application specific integrated circuit (ASIC), field programmable gate array (FPGA). The system may also include memory such as random access memory (RAM) and read only memory (ROM) accessed by the processor.

Determining the relative-location/geo-location of the RF emitter may be performed with various PROC measurements from the platform(s) that may be corrected for attitude changes, and supplemented with AOA measurements from an SBI. The location information may also be computed a plurality of times and filtered to increase accuracy.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A system for determining a location of a radio frequency (RF) emitter transmitting an RF signal, the system comprising:
    a long baseline interferometer (LBI) including a first antenna and a second antenna positioned on a vehicle to receive the RF signal transmitted by the RF emitter;
    a short baseline interferometer (SBI) including a third antenna and a fourth antenna positioned on the vehicle to receive the RF signal transmitted by the RF emitter; and
    a processor positioned on the vehicle configured to:
    a) determine a first phase rate of change (PROC) of the RF signal received by the LBI over a short time interval to produce a short time interval range estimate of the RF emitter,
    b) determine a second PROC of the RF signal received by the LBI over a long time interval which is greater than the short time interval, to produce a plurality of long time interval range estimates of the RF emitter,
    c) determine an angle of arrival (AOA) of the RF signal received by the SBI,
    d) select one of the plurality of long time interval range estimates based on the short time interval range estimate, and
    e) determine the location of the RF emitter based on the selected long time interval range estimate and the determined AOA in step c.

2. The system of claim 1,
    wherein the processor is configured to:
    f) repeat steps a-e a plurality of times to determine a plurality of locations of the RF emitter, and
    g) determine a final location based on the plurality of locations.

3. The system of claim 1, including
    another LBI including a fourth antenna and a fifth antenna positioned on the vehicle to receive the RF signal transmitted by the RF emitter;
    another SBI including a sixth antenna and a seventh antenna positioned on the vehicle to receive the RF signal transmitted by the RF emitter,
    wherein concurrent with performing steps a-e with the LBI and SBI, the processor is configured to perform steps a-e with the other LBI and the other SBI, and the processor determines a final location of the RF emitter based on the location determined by the LBI and the SBI, and the location determined by the other LBI and the other SBI.

4. The system of claim 1, including
    another LBI including a fourth antenna and a fifth antenna positioned on another vehicle to receive the RF signal transmitted by the RF emitter;
    another processor positioned on the other vehicle configured to perform steps a, b and d with the other LBI on the other vehicle to produce another short time interval range estimate of the RF emitter, another plurality of long time interval range estimates of the RF emitter, and another selected one of the other plurality of long time interval range estimates a transmitter positioned on the other vehicle for transmitting the other selected one of the other plurality of long time interval range estimates to the vehicle, wherein the vehicle utilizes the other selected one of the other plurality of long time interval range estimates to perform step e.

5. The system of claim 2, including
an adaptive filter for adaptively filtering the plurality of locations to determine the final location.

6. The system of claim 1, wherein the location is a relative location from the vehicle to the RF emitter determined by a relative distance and a relative angle from the vehicle to the RF emitter.

7. The system of claim 1, including
a GPS receiver for receiving GPS signals, and
wherein the processor is configured to:
f) determine a geo-location of the vehicle based on the GPS signals at each of steps a, b and c, and
g) determine the geo-location of the RF emitter based on the AOA computed in step c, the selected long time interval range estimate selected in step d and the geo-location of the vehicle computed in steps a, b and c.

8. A system for determining a location of a radio frequency (RF) emitter transmitting an RF signal, the system comprising:
a long baseline interferometer (LBI) including a first antenna and a second antenna positioned on a vehicle to receive the RF signal transmitted by the RF emitter;
a navigation system positioned on the vehicle; and
a processor positioned on the vehicle configured to:
a) determine a first phase rate of change (PROC) of the RF signal received by the LBI over a short time interval to produce a short time interval range estimate of the RF emitter,
b) determine a second PROC of the RF signal received by the LBI over a long time interval which is greater than the short time interval, to produce a plurality of long time interval range estimates of the RF emitter,
c) record a first position of the vehicle during step a, and a second position of the vehicle during step b using the navigation system,
d) select one of the plurality of long time interval range estimates based on the short time interval range estimate,
e) repeat steps a-d a predetermined number of times to produce a plurality of selected long time interval range estimates, and a plurality of recorded positions of the vehicle, and
f) determine the geo-location of the RF emitter based on the plurality of selected long time interval range estimates and a plurality of recorded positions of the vehicle.

9. The system of claim 8, including
a short baseline interferometer (SBI) including a third antenna and a fourth antenna positioned on the vehicle to receive the RF signal transmitted by the RF emitter,
wherein the processor is configured to determine an angle of arrival (AOA) of the RF signal received by the SBI, and perform step f based on the AOA.

10. The system of claim 8, including
another LBI including a third antenna and a fourth antenna which are positioned on the vehicle to receive the RF signal transmitted by the RF emitter, and
wherein the processor is configured to simultaneously perform steps a-f with the LBI and the other LBI.

11. The system of claim 8, including
another LBI including a third antenna and a fourth antenna which are positioned on another vehicle to receive the RF signal transmitted by the RF emitter,
another processor positioned on the other vehicle configured to perform steps a-e to produce another plurality of selected long time interval range estimates, and another plurality of recorded positions of the other vehicle, and
a transmitter positioned on the other vehicle for transmitting the other plurality of selected long time interval range estimates, and the other plurality of recorded positions to the vehicle,
wherein the vehicle utilizes the other plurality of selected long time interval range estimates to perform step f.

12. The system of claim 8, including
an adaptive filter,
wherein the processor is configured to:
g) repeat steps a-f to determine a plurality geo-locations of the RF emitter, and
h) determine a maximum likelihood geo-location of the RF emitter by adaptively filtering the plurality of geo-locations.

13. The system of claim 8, including
a GPS receiver for receiving GPS signals,
wherein the processor is configured to:
g) determine the geo-location of the vehicle based on the received GPS signals, and
h) determine the geo-location of the RF emitter based on the geo-location of the vehicle and the selected long time interval range estimates.

14. The system of claim 8, including
an attitude sensor that senses the roll, pitch and yaw of the vehicle,
wherein the processor is configured to:
g) measure a first attitude when measuring the first PROC,
h) measure a second attitude when measuring the second PROC, and
i) remove phase artifacts from the second PROC which are present due to differences between the first attitude and the second attitude.

15. A system for resolving phase ambiguities in phase rate of change (PROC) measurements of a long baseline interferometer (LBI), the system comprising:
an LBI including a first antenna and a second antenna positioned on a vehicle to receive an RF signal transmitted by an RF emitter; and
a processor positioned on the vehicle configured to:
a) determine a first phase rate of change (PROC) of the RF signal received by the LBI over a short time interval to produce a short time interval range estimate of the RF emitter,
b) determine a second PROC of the RF signal received by the LBI over a long time interval which is greater than the short time interval, to produce a plurality of ambiguous long time interval range estimates of the RF emitter,
c) select one of the plurality of long time interval range estimates based on the short time interval range estimate.

16. The system of claim 15, wherein the processor is configured to select one of the plurality of long time interval range estimates that is closest to the short time interval range estimate.

17. The system of claim 15, wherein the short time interval and long time interval are set to determine resolve ambiguities in the PROC measurements and determine a distance from the vehicle to the RF emitter within a predetermined error range.

18. The system of claim 15, wherein the processor is configured to determine the PROC measurements by:
- d) measuring a first phase of the received RF signal with the LBI at a first time,
- e) measuring a first attitude of the vehicle with the navigation system at the first time,
- f) measuring a second phase of the received RF signal with the LBI at a second time,
- g) measuring a second attitude of the vehicle with the navigation system at the second time, and
- h) determining a change in phase of the RF signal from the first time to the second time by removing artifact phase changes produced by a change in attitude from the first time to the second time.

19. The system of claim 15, wherein the processor is configured to:
- d) repeat steps a-c to produce a plurality of selected long time interval range estimates, and
- e) determine a location of the RF emitter based on a common intersection between the plurality of selected long time interval range estimates.

20. The system of claim 15, including
a short baseline interferometer (SBI) including a third antenna and a fourth antenna positioned on the vehicle to receive the RF signal transmitted by the RF emitter,
wherein the processor is configured to:
- d) determine an angle of arrival (AOA) of the RF signal received by the SBI, and
- e) determine a location of the RF emitter based on a common intersection between the selected long time interval range estimate and the AOA.

* * * * *